US012504670B2

(12) United States Patent
Kim et al.

(10) Patent No.: US 12,504,670 B2
(45) Date of Patent: Dec. 23, 2025

(54) LENS DRIVING DEVICE AND A CAMERA MODULE INCLUDING THE SAME

(71) Applicant: LG INNOTEK CO., LTD., Seoul (KR)

(72) Inventors: Min Kim, Seoul (KR); Sung Ki Jung, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 238 days.

(21) Appl. No.: 18/557,971

(22) PCT Filed: Apr. 29, 2022

(86) PCT No.: PCT/KR2022/006210
§ 371 (c)(1),
(2) Date: Oct. 30, 2023

(87) PCT Pub. No.: WO2022/231391
PCT Pub. Date: Nov. 3, 2022

(65) Prior Publication Data
US 2024/0210787 A1  Jun. 27, 2024

(30) Foreign Application Priority Data

Apr. 30, 2021 (KR) .................. 10-2021-0056686

(51) Int. Cl.
*H04N 23/54* (2023.01)
*G03B 3/10* (2021.01)
(Continued)

(52) U.S. Cl.
CPC ................ *G03B 3/10* (2013.01); *G03B 5/06* (2013.01); *H04N 23/54* (2023.01); *H04N 23/55* (2023.01);
(Continued)

(58) Field of Classification Search
CPC ........ H04N 23/54; H04N 23/55; H04N 23/57; H04N 23/687; G03B 3/10; G03B 5/06;
(Continued)

(56) References Cited

U.S. PATENT DOCUMENTS

2011/0286732 A1   11/2011   Hosokawa et al.
2012/0229926 A1   9/2012   Wade et al.
(Continued)

FOREIGN PATENT DOCUMENTS

KR   10-2019-0025877 A   3/2019
KR   10-2020-0060201 A   5/2020
(Continued)

OTHER PUBLICATIONS

International Search Report dated Aug. 16, 2022 in International Application No. PCT/KR2022/006210.

*Primary Examiner* — Daniel M Pasiewicz
(74) *Attorney, Agent, or Firm* — Saliwanchik, Lloyd & Eisenschenk

(57) ABSTRACT

Embodiments relate to a lens driving device and a camera module including the same. A lens driving device according to an embodiment includes a substrate, a first frame including a lens and disposed on the substrate, a second frame on which the first frame is placed and a third frame on which the second frame is disposed. The first frame can move in a Z-axis direction, the second frame can tilt in X-axis and Y-axis directions and rotate around the Z axis, and the third frame can include a stopper structure to limit tilting and rotation of the second frame.

20 Claims, 19 Drawing Sheets

(51) Int. Cl.
   *G03B 5/06* (2021.01)
   *H04N 23/55* (2023.01)
   *H04N 23/57* (2023.01)
   *H04N 23/68* (2023.01)
   *G03B 30/00* (2021.01)

(52) U.S. Cl.
   CPC ........... *H04N 23/687* (2023.01); *G03B 30/00* (2021.01); *G03B 2205/0015* (2013.01); *G03B 2205/0023* (2013.01); *H04N 23/57* (2023.01)

(58) Field of Classification Search
   CPC ............ G03B 30/00; G03B 2205/0015; G03B 2205/0023
   See application file for complete search history.

(56) References Cited

U.S. PATENT DOCUMENTS

| | | | |
|---|---|---|---|
| 2014/0009631 A1* | 1/2014 | Topliss | H04N 23/687 348/208.11 |
| 2017/0285363 A1* | 10/2017 | Hu | G02B 7/09 |
| 2021/0318592 A1* | 10/2021 | Kim | G03B 5/00 |
| 2022/0179164 A1 | 6/2022 | Kim | |
| 2022/0191359 A1 | 6/2022 | Oh | |

FOREIGN PATENT DOCUMENTS

| | | |
|---|---|---|
| KR | 10-2020-0083952 A | 7/2020 |
| KR | 10-2020-0114251 A | 10/2020 |
| KR | 10-2020-0114263 A | 10/2020 |

\* cited by examiner

LENS DRIVING DEVICE AND A CAMERA MODULE INCLUDING THE SAME

CROSS-REFERENCE TO RELATED APPLICATIONS

This application is the U.S. national stage application of International Patent Application No. PCT/KR2022/006210, filed Apr. 29, 2022, which claims the benefit under 35 U.S.C. § 119 of Korean Application No. 10-2021-0056686, filed Apr. 30, 2021, the disclosures of each of which are incorporated herein by reference in their entirety.

TECHNICAL FIELD

The embodiment relates to a lens driving device and a camera module including the same.

BACKGROUND ART

The camera module performs the function of capturing a subject and saving it as an image or video, and is used by being mounted on mobile terminals such as mobile phones, laptops, drones, and vehicles.

Meanwhile, portable devices such as smartphones, tablet PCs, and laptops are equipped with ultra-small camera modules, and these camera modules automatically adjust the distance between the image sensor and the lens to align the focal length of the lens, so autofocus (AF) function can be performed.

Additionally, recent camera modules can perform the zooming function of zooming up or zooming out by increasing or decreasing the magnification of distant subjects through a zoom lens.

Additionally, recent camera modules adopt image stabilization (IS) technology which is a technology that corrects or inhibits image shake caused by unstable fixtures, user movement, or camera movement due to vibration or shock.

These image stabilization (IS) technologies include optical image stabilizer (OIS) technology and image stabilization technology using image sensors.

OIS technology is a technology that corrects movement by changing the path of light, and image stabilization technology using an image sensor is a technology that corrects movement using mechanical and electronic methods. OIS technology is being adopted more and more.

Meanwhile, camera modules are being applied to vehicles, and camera modules can be products that transmit images around the vehicle or inside the vehicle to a display and can be used for driving assistance systems or parking assistance.

In addition, the vehicle camera module detects lanes and other vehicles around the vehicle, collects and transmits the detected data, so the vehicle camera module allows the ECU to issue a warning or control the vehicle. Meanwhile, as the image sensor becomes higher pixels, the resolution increases and the size of the pixel becomes smaller. However, as the pixel becomes smaller, the amount of light received at the same time decreases. Therefore, the higher the resolution of the camera, the more severe the image is shaken in a dark environment due to hand trembling caused by slower shutter speeds.

Accordingly, the OIS function has recently been adopted as essential to capture images without distortion using high-resolution cameras when recording in the dark at night or video recording.

Meanwhile, OIS technology is a method of correcting image quality by moving the camera's lens or image sensor to modify the optical path. In particular, OIS technology detects camera movement through a gyro sensor and based on this, the distance the lens or image sensor should move is calculated.

For example, OIS correction methods include the Lens Shift method and the Lens Tilt method.

Meanwhile, in the case of the lens movement method, as the lens moves, the optical axis, which is the standard for the point with the highest spatial resolution value in the image sensor, moves repeatedly, causing severe distortion in the video and in addition, severe distortion is causing of feeling nausea to users. Additionally, the problem of video distortion in this lens movement method also occurs in the sensor movement method.

In addition, in the case of the existing lens tilt method, the distance between the lens and the image sensor changes as the optical axis is repeatedly twisted according to the tilting of the lens, and the optical axis, which is the standard for the spatial resolution value, is repeatedly moved, causing distortion of the video, so distortion is occurring more severely. The problem of video distortion in the lens tilt method is also a problem in the sensor tilt method.

However, a proper technical solution to the above-mentioned problem is not available.

In addition, the OIS technology of the related art has a complicated structure because it requires a mechanical drive device for lens movement, sensor movement, etc., and there were limitations in implementing an ultra-small camera module.

In the applicant's internal technology, a method of moving modules including lenses and image sensors was studied to solve the above technical problems. The module movement method has a wider correction range than the lens movement method, and because the optical axis of the lens and the axis of the image sensor are not distorted, it has the technical effect of minimizing image deformation and eliminating image distortion.

Meanwhile, rotation for OIS implementation includes pitch, which refers to rotational movement in the vertical direction using the horizontal coordinate axis of the camera module as the rotation axis, yaw, which means rotational movement in the left and right directions using the vertical coordinate axis of the camera module as the rotation axis, and a roll, which refers to a rotational movement with the optical axis passing in the front and rear direction of the camera module as the rotation axis.

Meanwhile, in OIS implementation, a larger force is required for rolling torque in roll implementation compared to pitch and yaw implementation.

In the related art, a method of increasing the magnet size or coil current is adopted to increase the driving force, but there is a limitation in that the roll is not implemented properly.

In addition, in the related art, a stopper for AF implementation was adopted, but there was a limitation in that the stopper for OIS implementation could not be properly adopted, so there was a problem of deteriorating the reliability of the camera module in the event of an external impact, etc.

Also, according to internal technology, there is a problem of difficulty in rolling correction for OIS implementation. In particular, according to the internal technology, there is difficulty in implementing rolling for the tilt method (yaw or pitch), and there is no way to receive feedback on the position of the three axes of the OIS driver.

Meanwhile, in order to achieve the best optical characteristics by using multiple zoom lens groups in a camera module, alignment between multiple lens groups and alignment between multiple lens groups and the image sensor are required. But, when the spherical center of the lens group deviates from the optical axis (decenter), or the lens tilt phenomenon (tilt) happens, or the central axes of the lens group and the image sensor are not aligned, the angle of view changes or out of focus occurs, adversely affecting image quality or resolution.

Meanwhile, in the related art, when an impact is applied to the camera module, a technical problem can occur in which components of the camera module are separated. For example, if a mobile phone equipped with a camera module is dropped or in a high-vibration environment such as a vehicle, each component of the camera module (e.g., barrel, housing, magnet, etc.) can be detached, this phenomenon can cause major problems not only in mechanical reliability but also in thrust, precision, and control.

Meanwhile, as previously described, camera modules can be applied to vehicles along with radar and used in advanced driver assistance systems (ADAS), which can have a significant impact on the safety and lives of drivers and pedestrians in addition to driver convenience.

When a camera module is applied to a vehicle's advanced driver assistance system (ADAS), OIS technology becomes more important due to vehicle vibration, and the accuracy of OIS data can be directly related to the safety or life of drivers or pedestrians.

Additionally, when implementing AF or zoom, multiple lens assemblies are driven by electromagnetic force between magnets and coils, and there is a problem of magnetic field interference between magnets mounted on each lens assembly. Due to magnetic field interference between these magnets, AF or zoom operation does not work properly, leading to a decrease in thrust. Additionally, there is a problem of causing decenter or tilt phenomenon due to magnetic field interference between magnets.

If there is an issue with the precision of camera control, the thrust is reduced, or a decenter or tilt phenomenon occurs due to such magnetic field interference, it can directly affect the safety or life of the user such as driver or of pedestrians.

Meanwhile, in related camera module technology, the initial position of the lens is controlled by preloading the spring structure in the existing AF structure. However, this spring preload structure is vulnerable to high-frequency vibration, has high driving resistance due to the rigidity caused by the spring, and has technical problems in that dynamic tilt occurs.

Meanwhile, the content described in the item simply provides background information and does not constitute prior art.

DISCLOSURE

Technical Problem

One of the technical problems of the embodiment is to provide a lens driving device and a camera module including the same that can solve the problem of requiring a greater force for rolling torque in roll implementation compared to pitch and yaw implementation in OIS implementation.

Additionally, one of the technical problems of the embodiment is to provide a lens driving device and a camera module including the same that can solve the rolling correction problem for OIS implementation.

In addition, one of the technical problems of the embodiment is to provide a lens driving device and a camera module including the same that can solve the problem of deteriorating the reliability of the camera module when external shocks, etc. occur in OIS implementation.

Additionally, one of the technical problems of the embodiment is to provide a lens driving device and a camera module including the same that can solve the technical problem of components of the lens driving device being separated when an impact is applied to the camera module.

In addition, one of the technical problems of the embodiment is to provide a driving device and a camera module including the same that can solve the technical problems of high-frequency vibration generation due to the spring structure in the AF structure of the camera module, increased driving resistance, and dynamic tilt.

Additionally, one of the technical problems of the embodiment is to provide a lens driving device and a camera module including the same that can inhibit magnetic field interference between magnets when implementing AF or OIS.

The technical problems of the embodiments are not limited to those described in this item, but include those that can be understood from the entire description of the invention.

Technical Solution

A lens driving device according to an embodiment includes a substrate, a first frame including a lens and disposed on the substrate, a second frame on which the first frame is placed and a third frame on which the second frame is disposed.

The first frame can move in the Z-axis direction, the second frame can tilt in the X-axis and Y-axis directions and can rotate around the Z-axis, and the third frame can include a stopper structure to limit tilting and rotation of the second frame.

Additionally, the embodiment can further include a second position sensor and a third position sensor disposed on the substrate and sensing the degree of tilting of the second frame in the X-axis and Y-axis directions.

Additionally, the embodiment can further include a fourth position sensor disposed on the substrate and sensing the degree of rotation of the second frame around the Z axis.

The second position sensor can sense the pitch position through interaction with the first-second magnet part disposed in the second frame.

The third position sensor can sense the yaw position through interaction with the first-third magnet part disposed in the second frame.

The fourth position sensor can sense the rolling position through interaction with the second magnet part disposed on the third frame.

The third frame can include a stopper structure that limits tilting and rotation of the second frame.

The stopper structure can include four stopper structures including two stopper structures in the X-axis direction and two stopper structures in the Y-axis direction.

The stopper structure can be symmetrically disposed at four corners of the third frame.

In addition, the lens driving device according to the embodiment can include a first housing in which a lens assembly is disposed and a magnet is disposed, and a second housing in which a coil is disposed and arranged to surround the first housing, The first housing can include a protrusion that protrudes toward the coil at a position corresponding to the coil.

The magnet can be disposed on the protrusion, and the second housing can overlap the protrusion in the vertical direction.

The end of the protrusion can have a groove in which the magnet is placed.

The first housing includes a first surface facing the second housing, the second housing includes a second surface facing the first housing, and the first surface and the second surface can include a curved surface in which the center is convex to the outside of the upper and lower portions.

The embodiment can include a second guide member disposed between the first surface and the second surface.

The second housing can include a groove in which the protrusion is disposed.

The magnet can be placed closer to the coil than the groove.

The first housing can be rotated and tilted based on the optical axis by the first surface, the second surface, and the second guide member, and the protrusion contacts the second housing, so the rotational drive and the tilting drive can be limited.

In addition, the lens driving device according to the embodiment includes a first housing in which a lens assembly is disposed and a magnet is disposed, and a second housing in which a coil is disposed and arranged to surround the first housing, The first housing can include a protrusion that protrudes toward the coil at a position corresponding to the coil.

The second housing includes a groove in which the protrusion is disposed, the groove having a first surface corresponding to the first side of the protrusion, a second surface corresponding to the second side of the protrusion, and a third side corresponding to the lower side of the protrusion.

According to an embodiment, a predetermined magnet can be mounted on the protrusion of the first housing, and the second housing can overlap the protrusion in the vertical direction.

The first housing includes a first surface facing the second housing, the second housing includes a second surface facing the first housing, and the first surface and the second surface can include a curved surface whose center is convex outwardly from the upper and lower sides, and can include a second guide member disposed between the first surface and the second surface.

Additionally, a lens driving device according to an embodiment includes a fixing unit; and a moving part that moves relative to the fixed part.

The moving part includes a protrusion, and the fixed part has a first surface and a second surface in contact with the protrusion to limit rotation of the moving part in the first direction, a third surface that limits tilting toward a second surface different from the first direction of the moving part.

The embodiment can include a stopper that limits the rotation of the moving part.

In addition, the lens driving device according to the embodiment can include a first housing in which a lens assembly is disposed and a magnet is disposed, and a second housing in which a coil is disposed and arranged to surround the first housing.

The first housing can include a protrusion protruding toward the coil at a position corresponding to the coil.

The second housing can include a first area in contact with the protrusion when the first housing is rotated around the optical axis, and a second area in contact with the protrusion when the first housing is tilted.

Additionally, the lens driving device according to the embodiment can include a first frame on which a lens is placed, a second frame on which the first frame is placed, and a third frame on which the second frame is placed.

The first frame moves in the Z-axis direction, the second frame tilts in the X-axis and Y-axis directions and rotates around the Z-axis, and the third frame can include a limiting stopper structure stopper structure limiting tilting and rotating of the second frame.

The stopper structure can include four stopper structures, two in the X-axis direction and two in the Y-axis direction.

The stopper structure can be symmetrically disposed at four corners of the third frame.

In addition, the lens driving device according to the embodiment includes a fixed part and a moving part that moves relative to the fixed part, the moving part includes a protrusion, and the fixing part include a stopper where the protrusion is inserted into, and the stopper can limit rotation of the moving part.

The stopper can be formed with three sides of the groove.

The fixing part can include a receiving part in which the protrusion is disposed.

One surface of the receiving part can include a groove into which the protrusion is inserted.

The width of the upper area of one surface of the stopper can be larger than the width of the middle area.

One side of the end area of the protrusion can be disposed on one side of the magnet, and the other side facing one side can be open.

A camera module according to an embodiment can include any of the above lens driving devices.

Advantageous Effects

According to the lens driving device and the camera module including the same according to the embodiment, the embodiment can solve the problem of requiring a greater force for rolling torque in roll implementation compared to pitch and yaw implementation in OIS implementation.

For example, in the embodiment, the second magnet part MN2 for implementing roll is placed further away compared to the second magnet part MN2 for implementing pitch or yaw based on the center of the lens (100) or bobbin (200), so the problem of requiring greater force for rolling torque can be solved.

Also, for example, according to the embodiment, the second magnet part MN2 disposed at the corner of the second housing 400 and facing the second coil portion CL2 can be placed further away from the center of the lens 100 or the center of the bobbin 200 compared to the first magnet part MN1 facing the third coil part CL3, so the distance of the driving point is increased, which has a special technical effect of increasing the driving force by implementing greater torque.

Additionally, the embodiment has the technical effect of solving the rolling correction problem for OIS implementation.

Additionally, the embodiment can solve the problem of deteriorating the reliability of the camera module when external shocks, etc. occur in OIS implementation.

For example, in an embodiment, the protrusion 320 of the first housing 300 can be located in the housing groove 400R of the second housing 400, also, there is a technical effect in that the protrusion 320 of the first housing 300 and the housing groove 400R of the second housing 400 can implement a 3-axis OIS-related stopper function, so the embodiment can solve the problem of deteriorating the reliability of the camera module when an external shock or the like occurs.

Additionally, the embodiment can solve the technical problem of components of the lens driving device being separated when an impact is applied to the camera module. For example, according to the embodiment, the first housing 300 can be provided with a first guide groove GH1, and the bobbin 200 can be provided with a second guide groove GH2.

In the embodiment, the first guide member 220 for AF driving of the lens is disposed between the first guide groove GH1 and the second guide groove GH2, and the first guide groove GH1 and the second guide groove GH2 can function as a guide rail. At this time, the first guide member 220 can be disposed. The first guide groove GH1 can have an asymmetric shape.

For example, the second guide groove GH2 can have a shape corresponding to the outer peripheral surface of the first guide member 220. For example, the second guide groove GH2 can have a curved shape corresponding to the outer peripheral surface of the first guide member 220.

Additionally, the first guide groove GH1 can include a first guide surface 311 and a second guide surface 312 that can contact the first guide member 220. The first guide surface 311 and the second guide surface 312 can be flat.

In the embodiment, the angle Θ formed by the first guide surface 311 and the second guide surface 312 can be an acute angle.

According to the embodiment, the first guide groove GH1 where the first guide member 220 is disposed can have an asymmetric shape, so even if an impact or the like occurs, there is a technical effect of providing a movement path through which the lens can move with minimal friction while inhibiting the first guide member 220 from being separated.

Also, in the embodiment, the angle Θ formed by the first guide surface 311 and the second guide surface 312 can be an acute angle, and even if an impact or the like occurs through this, the first guide member 220 has a technical effect that can inhibit the deviation.

Additionally, the lens driving device according to the embodiment and the camera module including the same can inhibit the first guide member 220 from being separated when implementing AF, zooming, or OIS, so AF and OIS implementation for the lens can be more precise and the embodiment solves the problem of decenter or tilt. So, the embodiment has the technical effect of significantly improving image quality and resolution by inhibiting changes in the angle of view or loss of focus by the alignment between the plurality of lens groups being well achieved.

In addition, according to the embodiment, it is possible to solve the technical problems of high-frequency vibration generation due to the preload spring structure in the AF structure, increased driving resistance, or dynamic tilt.

For example, according to the embodiment, a spring vulnerable to high-frequency vibration is deleted from the AF structure, so a guide shaft can be applied to provide a structure that moves the lens with minimal friction and tilt. According to the embodiment, the first guide member 220 for AF driving can be disposed between the first guide groove GH1 and the second guide groove GH2, so there is no vibration caused by high frequency compared to the conventional spring structure, there is less driving resistance and lower power consumption since there is no spring structure, also there is a technical effect of less dynamic tilt compared to the guide bearing structure.

Also, according to the embodiment, there is a technical effect of inhibiting magnetic field interference between magnets when implementing AF or OIS. For example, in the related internal technology, there is a problem in that AF driving or OIS driving is not performed properly due to magnetic field interference between the magnet for AF driving and the magnet for OIS driving, resulting in a decrease in thrust. Additionally, there is a problem of causing decenter or tilt phenomenon due to magnetic field interference between magnets.

According to an embodiment, there is a technical effect of providing a lens driving device and a camera module including the same that can inhibit magnetic field interference between magnets by varying the arrangement positions of the magnet for OIS driving and the magnet for AF driving.

The technical effects of the embodiments are not limited to those described in this item and include those that can be understood from the entire description of the invention.

MODE FOR INVENTION

Figure 1A:
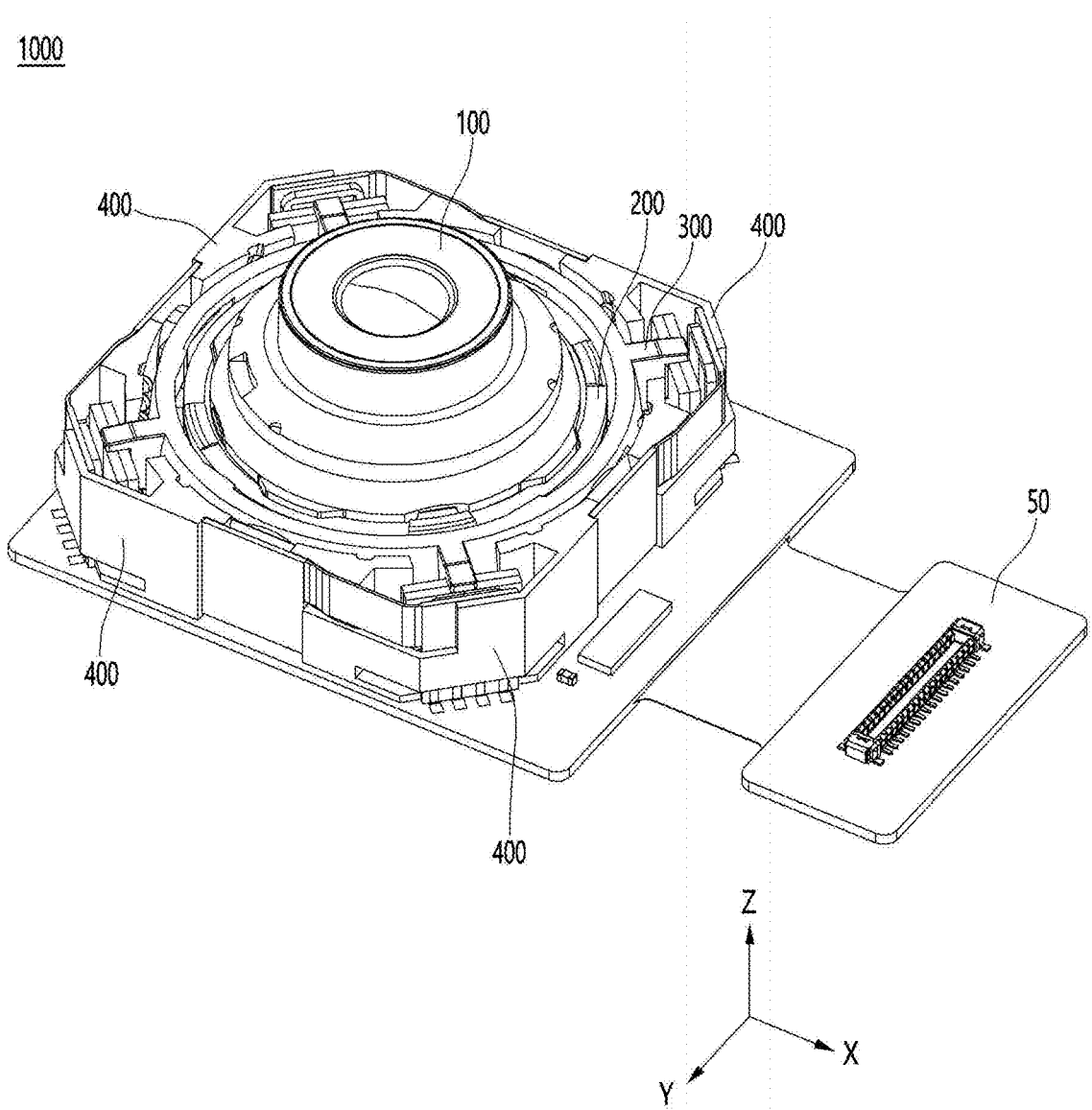
FIG. 1A is a perspective view of a camera module according to an embodiment.

Hereinafter, the embodiment will be described in detail with reference to the attached drawings. Since the embodiments can be subject to various changes and have various forms, specific embodiments will be illustrated in the drawings and described in detail in the text. However, this is not intended to limit the embodiment to a specific disclosed form, and should be understood to include all changes, equivalents, and substitutes included in the spirit and technical scope of the embodiment.

Terms such as "first", "second", etc. can be used to describe various components, but the components should not be limited by the terms. The above terms are used for the purpose of distinguishing one component from another component. Additionally, terms specifically defined in consideration of the configuration and operation of the embodiment are only for explaining the embodiment and do not limit the scope of the embodiment.

In the description of the embodiment, in the case where each element is described as being formed on or under, on or under includes both elements that are in direct contact with each other or one or more other elements that are formed (indirectly) between the two elements. Additionally, when expressed as "up" or "on or under," it can include not only the upward direction but also the downward direction based on one element.

Additionally, relational terms such as "top/up/above" and "bottom/below/down" used below do not necessarily require or imply any physical or logical relationship or order between such entities or elements. However, it can be used to distinguish one entity or element from another entity or element.

Embodiment

Specific features of the camera module according to the embodiment will be described in detail below with reference to the drawings.

Figure 1B:
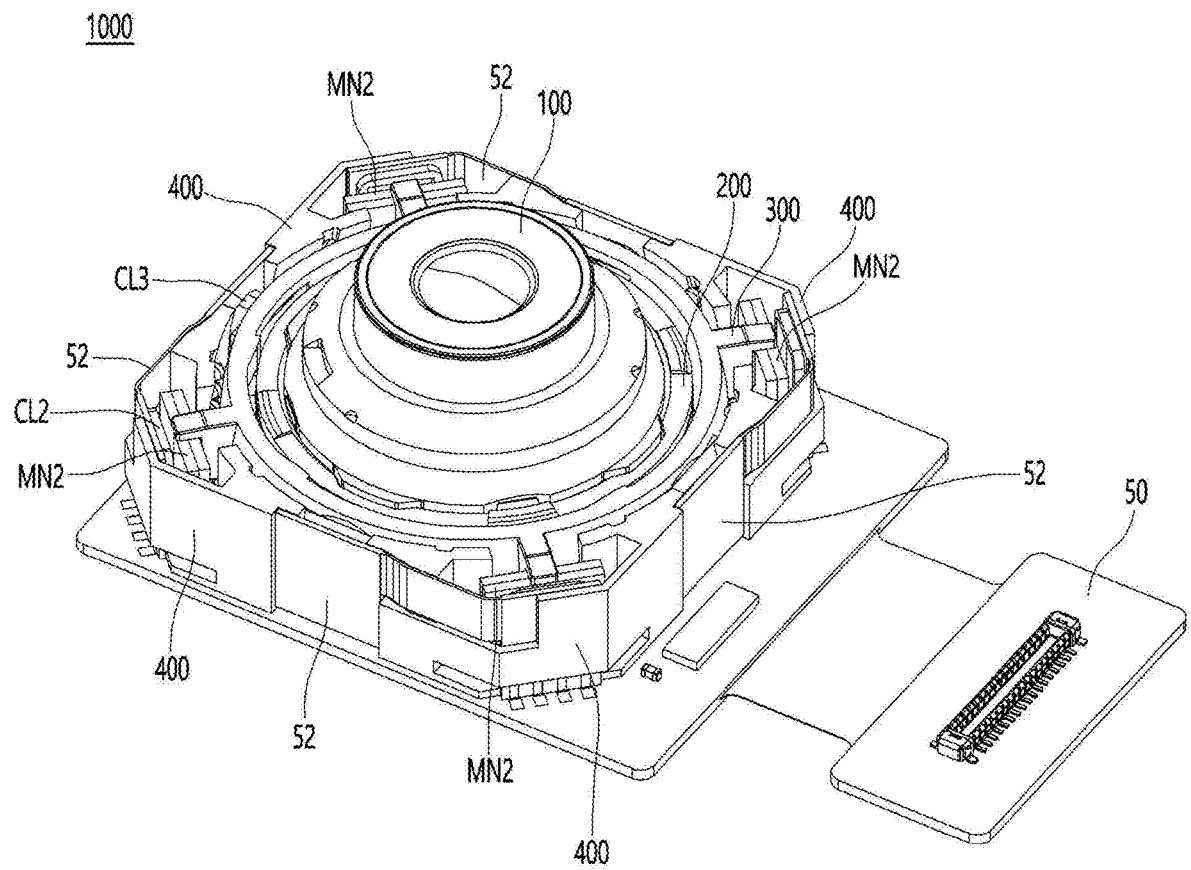
FIG. 1B is a detailed perspective view of a camera module according to the embodiment shown in FIG. 1A.

FIG. 1A is a perspective view of the camera module 1000 according to an embodiment, and FIG. 1B is a detailed perspective view of the camera module 1000 according to the embodiment shown in FIG. 1A.

In the X-Y-Z axis direction shown in FIG. 1A, the Z-axis refers to the direction of the optical axis or a direction parallel thereto, the XY-plane represents the ground perpendicular to the Z-axis, and the X-axis represents a direction perpendicular to the Z-axis on the ground (XY-plane) and the Y-axis is a direction perpendicular to the X-axis on the ground.

The camera module 1000 according to the embodiment can be a module tilting type that allows OIS to be implemented by moving the lens 100 and the image sensor (not shown) as one unit. Meanwhile, during AF operation, only the lens 100 can be moved while the image sensor is fixed and a distance from the image sensor can be changed, but is not limited to this.

Referring to FIG. 1A, the camera module 1000 according to the embodiment can include a circuit board 50, a bobbin 200 on which the lens 100 is disposed and disposed on the circuit board 50, a first housing 300 in which the bobbin 200 is placed and a second housing 400 in which the first housing 300 is placed.

A plurality of second housings 400 can be disposed outside the first housing 300. For example, the number of second housings 400 can be arranged at a corner outside the first housing 300, but the number is not limited thereto.

The circuit board 50 can be a PCB, Flexible Printed Circuit Boards (FPCB), or Rigid Flexible Printed Circuit Boards (RFPCB).

Next, referring to FIG. 1B, the embodiment can include a plurality of coil boards 52 electrically connected to the circuit board 50 and disposed in the second housing 400. A second coil part CL2 and a third coil part CL3 can be disposed on the coil substrate 52.

For example, the coil substrate 52 can be disposed in each of the four second housings 400, and each of a second coil portion CL2 and a third coil portion CL3 can be arranged respectively on each coil substrate 52, but are not limited to this.

Additionally, in the embodiment, a second magnet part MN2 can be disposed in the second housing 400. For example, a second magnet part MN2 can be disposed in each of the four second housings 400.

According to an embodiment, OIS driving can be possible by electromagnetic force between the second magnet part MN2 and the second coil part CL2.

Figure 2A:
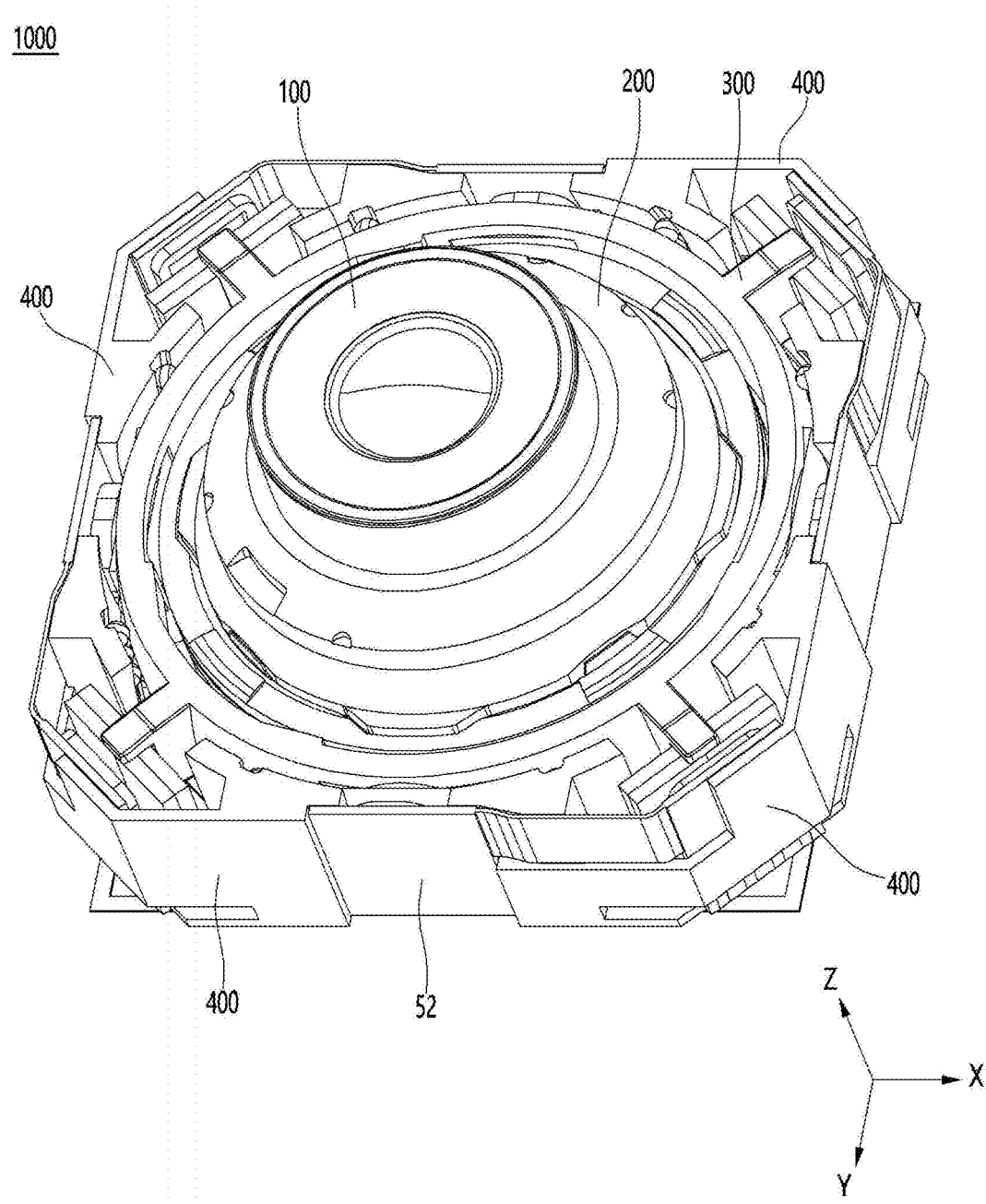
FIG. 2A is a view with the circuit board omitted from the camera module according to the embodiment shown in FIG. 1A.
Figure 2B:
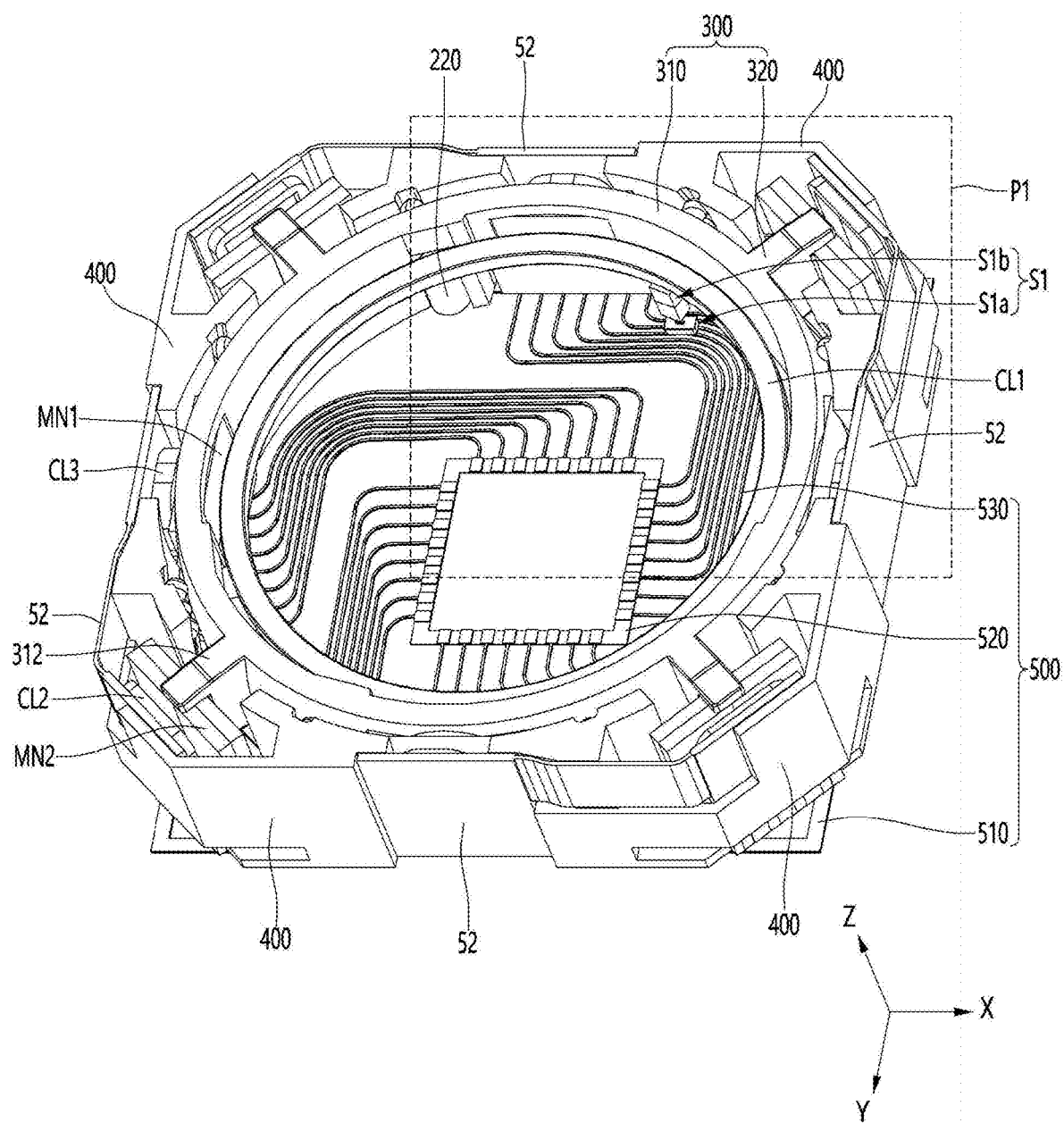
FIG. 2B is a detailed view with the bobbin and lens omitted from FIG. 2A.
Figure 2C:
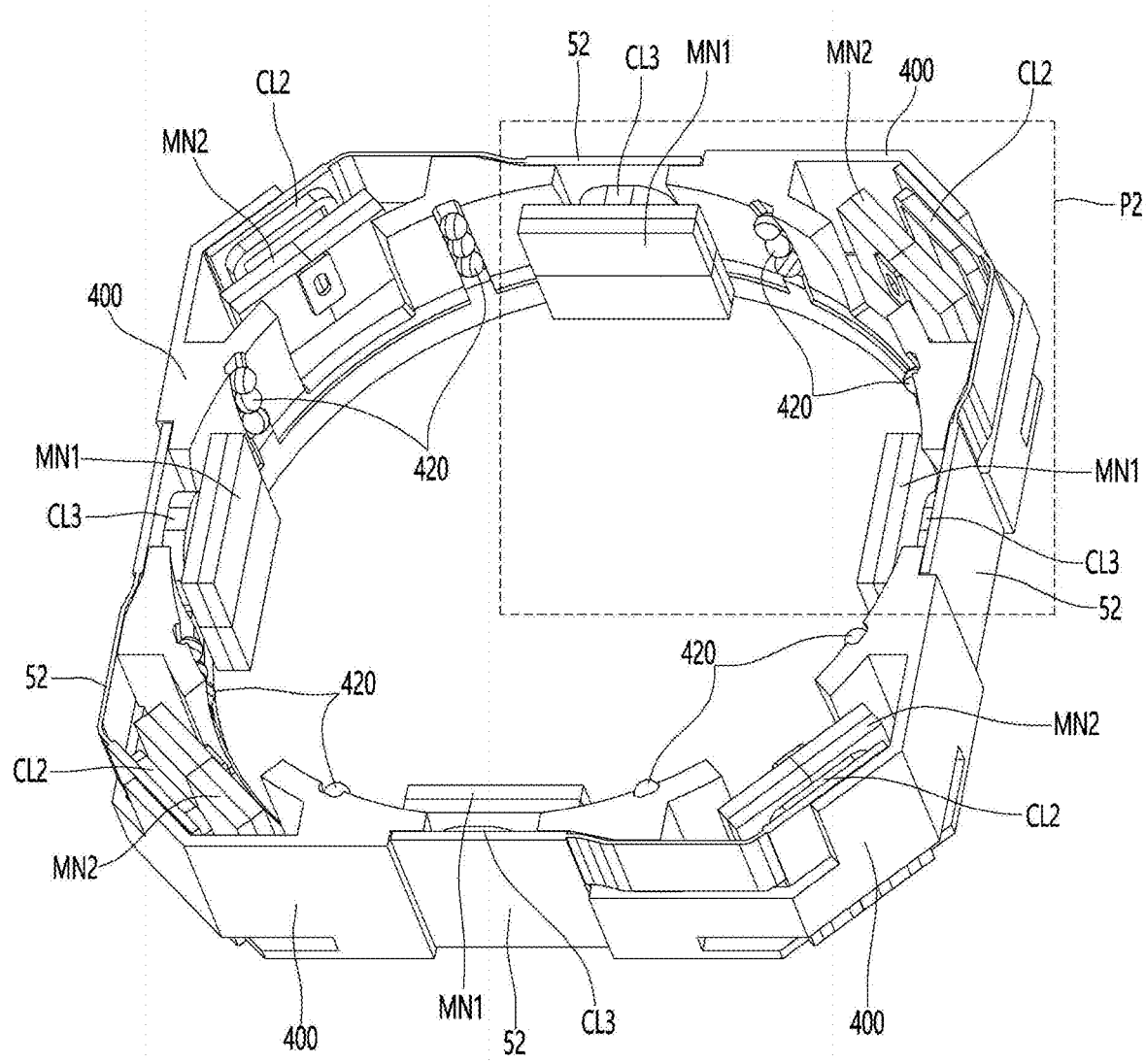
FIG. 2C is a detailed view in which the first housing, first guide part, and sensor substrate part are omitted from FIG. 2B.

Also, according to the embodiment, the first magnet part MN1 can be disposed in an area of the first housing 300 corresponding to the third coil part CL3 (see FIG. 2C). According to an embodiment, OIS can be driven by electromagnetic force between the first magnet part MN1 and the third coil part CL3. The first magnet part MN1 can also perform an AF driving function as will be described later. For example, part of the first magnet part MN1 can contribute to OIS driving, and another part of the first magnet part MN1 can contribute to AF driving.

In detail, OIS driving of the embodiment will be described with reference to FIGS. 2A to 2C. FIG. 2A is a diagram with the circuit board 50 omitted from the camera module according to the embodiment shown in FIG. 1A, and FIG. 2B is a detailed diagram with the bobbin 100 and lens 100 omitted from FIG. 2A.

Also, FIG. 2C is a detailed view in which the first housing 300, the first guide member 220, and the sensor substrate 500 are omitted from FIG. 2B.

First, referring to FIG. 2A, the camera module 1000 according to the embodiment includes a first housing 300 in which the bobbin 200 is placed and a second housing 400 in which the first housing 300 is placed.

Next, referring to FIG. 2B based on FIG. 2A, the embodiment can include a sensor substrate 500 that is electrically connected to the circuit board 50 and disposed below the second housing 400.

The camera module 1000 according to the embodiment can be a module tilting type that allows OIS to be implemented by moving the lens 100 and the image sensor (not shown) as one unit.

Through this, the embodiment enables OIS operation by moving the entire module, including the lens and image sensor, so the correction range is wider than that of the existing lens movement method, and the optical axis of the lens and the axis of the image sensor are rotated, so since the optical axis of the lens and the axis of the image sensor are not distorted, there is a technical effect of minimizing image deformation and eliminating image distortion.

Continuing to refer to FIG. 2B, the sensor substrate unit 500 can include a first sensor substrate portion 510 electrically connected to the circuit board 50, a second sensor substrate portion 520 on which an image sensor (not shown) is placed, and an elastic substrate portion 530 that connects the first sensor substrate portion 510 and the second sensor substrate portion 520.

The first sensor substrate portion 510 and the second sensor substrate portion 520 can be a rigid printed circuit board (Rigid PCB), and the elastic substrate portion 530 can be a flexible printed circuit board (Flexible PCB) or can be a rigid flexible printed circuit board (Rigid Flexible PCB), but is not limited thereto.

The elastic substrate portion 530 can be arranged in a curved shape in the form of a flexible circuit board.

Additionally, the embodiment can include a gyro sensor (not shown) disposed on the circuit board 50 to detect movement and a driving circuit element (not shown) that drives according to the input and output signals of the gyro sensor.

The gyro sensor of the embodiment can adopt a two-axis gyro sensor that detects two rotational movement amounts, pitch and yaw, which represent large movements in a two-dimensional image frame, and provides more accurate hand shake correction. For this purpose, a three-axis gyro sensor that detects all movement amounts of pitch, yaw, and roll can be adopted.

Movements corresponding to pitch, yaw, and roll detected by the gyro sensor can be converted into appropriate physical quantities depending on the hand shake correction method and correction direction.

The embodiment can implement AF and can include a first position sensor S1. For example, the first position sensor S can be a Hall sensor or a MR sensor (magneto resistive sensor), but is not limited thereto.

For example, the first sensor S1 can include a first-first sensor part S1a, which is a hall sensor, and a first-second sensor part S1b, which is a magnet part, but is not limited thereto. The first-first sensor part S1a can be disposed on the substrate 50, and the first-second sensor part S2b can be coupled to the lower side of the bobbin 200, but the present invention is not limited thereto.

Next, referring to FIGS. 2B and 2C together, the embodiment can include a plurality of coil substrates 52.

For example, the coil substrate 52 can be disposed in each of the four second housings 400, and each coil substrate 52 includes a second coil portion CL2 and a third coil portion CL3 arranged respectively, but are not limited to this.

Additionally, in the embodiment, a second magnet part MN2 can be disposed in the second housing 400. For example, a second magnet part MN2 can be disposed in each of the four second housings 400.

Referring to FIG. 2B, the second magnet part MN2 can be disposed on the protrusion 320 of the first housing 300. For example, the end of the protrusion 320 of the first housing 300 can have a protrusion groove (not shown) in which the second magnet part MN2 is disposed.

According to an embodiment, OIS can be driven by electromagnetic force between the second magnet part MN2 and the second coil part CL2.

Also, according to the embodiment, the first magnet part MN1 can be disposed in an area of the first housing 300 corresponding to the third coil portion CL3. According to an embodiment, OIS can be driven by electromagnetic force between the first magnet part MN1 and the third coil part CL3.

Specifically, according to the embodiment, OIS driving of pitch or yaw can be possible by electromagnetic force between the first magnet part MN1 and the third coil part CL3.

Also, according to an embodiment, roll OIS driving can be possible by electromagnetic force between the second magnet part MN2 and the second coil part CL2.

In OIS driving in the embodiment, the first housing 300 can rotate in pitch, yaw, or roll relative to the second housing 400 by the second guide member 420 disposed between the first housing 300 and the second housing 400.

Referring to FIG. 2B, in the embodiment, the outer surface of the first housing 300 and the inner surface of the second housing 400 can include a curved surface whose center is convex outward from the top and bottom. In an embodiment, OIS can be implemented through a curved surface.

For example, referring to FIG. 2C, the inner surface of the second housing 400 can include a curved surface whose center is convex outward from the top and bottom, and the module can rotate in pitch, yaw, or roll by rotating the module of the first housing 300 with respect to the second housing 400 by disposing the second guide member 420.

For example, referring to FIG. 2B, in the embodiment, the first housing 300 includes a first housing outer surface (not shown) facing the second housing 400, and the second housing 400 can include a second housing inner surface (not shown) facing the first housing 300.

The outer surface of the first housing and the inner surface of the second housing can include a curved surface whose center is convex outward from the top and bottom. In an embodiment, OIS can be implemented through a curved surface.

Also, referring to FIG. 2C, the embodiment can include a second guide member 420 disposed between the outer surface of the first housing and the inner surface of the second housing. In an embodiment, the first guide member 220 and the second guide member can have different shapes.

For example, the first guide member 220 can have a cylindrical shape, and the second guide member 220 can have a ball shape. The second guide member can be a bearing, but is not limited thereto.

Also, according to the embodiment, AF operation can be possible along the first guide portion 200 by mutual electromagnetic force between another part of the first magnet part MN1 and the first coil portion CL1 disposed around the bobbin 200.

According to the lens driving device and the camera module including the same according to the embodiment, the embodiment can solve problems that the rolling torque is to be greater in roll implementation than in pitch and yaw implementation in OIS implementation.

For example, in the embodiment, the second magnet portion MN2 for implementing roll can be placed farther away from the center of the lens 100 or the bobbin 200 compared to the second magnet portion MN2 for implementing pitch or yaw, so the embodiment can solve the problem of requiring greater force for rolling torque.

For example, according to the embodiment, the second magnet part MN2 disposed at the corner of the second housing 400 and facing the second coil part CL2 can be disposed farther from the center of the lens 100 or the center of the bobbin 200 than first magnet portion MN1 facing the third coil part CL3, so the distance of the driving point is increased, and there is a special technical effect that can increase driving force by implementing greater torque.

For example, the first housing 300 includes a hollow circular first housing frame 310 for accommodating the bobbin 200 and a protrusion 320 extending in the edge direction of the second housing 400 from the first housing frame 310.

At this time, the embodiment can include a first magnet part MN1 mounted on the first housing frame 310 and a second magnet part MN2 mounted on the end of the protrusion 320.

According to the embodiment, the second magnet part (MN2) is mounted on the protrusion 320 of the first housing 300 can be disposed far from the center of the lens 100 or the bobbin 200 compared to the first magnet part MN1 mounted on the first housing frame 310, so there is a special technical effect that the driving force can be increased by increasing the distance of the driving point even without increasing the magnet size or additional power.

Figure 2D:
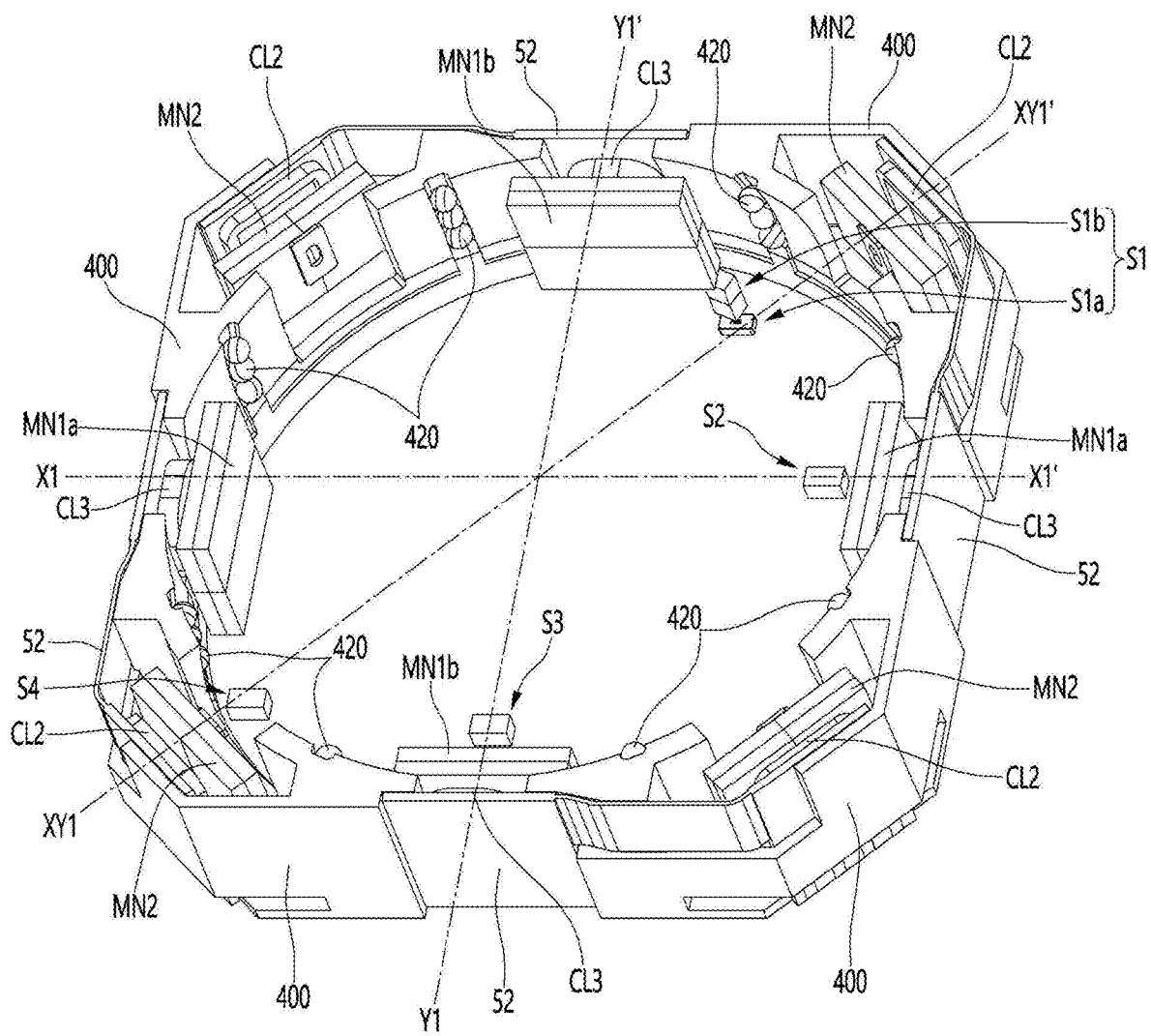
FIG. 2D is a second detailed view in which the first housing, first guide portion, and sensor substrate portion are omitted from FIG. 2B.

Next, FIG. 2D is a second detailed view in which the first housing, first guide portion, and sensor substrate portion are omitted from FIG. 2B.

As previously described, according to internal technology, there is a problem of difficulty in rolling correction for OIS implementation. In particular, according to the internal technology, there is difficulty in implementing rolling for the tilt method (yaw or pitch), and there is no way to receive feedback on the position of the three axes of the OIS driver.

According to the embodiment, the second position sensor S2 and the third position sensor S3 are provided on the substrate 50 to sense the positions of the pitch and yaw. The second position sensor S2 and the third position sensor S3 can be positioned for pitch and yaw, but are not limited thereto, and also can sense the location for yaw and pitch, respectively.

The second position sensor S2 and the third position sensor S3 can be Hall sensors or MR sensors (magneto resistive sensors) respectively, but are not limited thereto.

For example, the embodiment allows pitch driving based on the X1-X1' axis, the position according to pitch driving can be sensed and the position can be controlled by interaction between the second position sensor S2 and the first-second magnet part MN1a disposed on the substrate 50.

The second position sensor S2 can be placed at a position overlapping with the X1-X1' axis.

The X1-X1' axis can be an axis disposed in the X-axis direction and passes through the opposing first-second magnet parts MN1a, but is not limited thereto.

In the embodiment, the first-second magnet part MN1a may be disposed in an area of the first housing 300 corresponding to the third coil portion CL3 (see FIG. 2C), so OIS may be driven by electromagnetic force between the first-second magnet part MN1a and the third coil unit CL3. Additionally, the first-second magnet part MN1a can also perform an AF driving function. For example, some of the first-second magnet parts MN1a may contribute to OIS driving, another part of the first-second magnet part MN1a may contribute to AF driving.

In addition, some of the first-second magnet parts MN1a have a complex technical effect of sensing and controlling the position according to pitch driving by interaction with the second position sensor S2.

In addition, the embodiment is capable of yaw driving based on the Y1-Y1' axis, and the position can be sensed and controlled according to pitch driving by interaction between the third position sensor S3 and the first-third magnet part MN1b disposed on the substrate 50.

The third position sensor S3 can be placed at a position overlapping with the Y1-Y1' axis.

The Y1-Y1' axis can be disposed in the Y-axis direction and can be an axis that passes through the opposing first-third magnet parts MN1b, but is not limited thereto.

In the embodiment, the first-third magnet part MN1b may be disposed in an area of the first housing 300 corresponding to the third coil part CL3 (see FIG. 2C), so OIS may be driven by electromagnetic force between the first-third magnet part MN1b and the third coil unit CL3. Additionally, the first-third magnet part MN1b can also perform an AF driving function. For example, some of the first-third magnet parts MN1b may contribute to OIS driving, and other parts of the first-third magnet parts MN1b may contribute to AF driving.

In addition, some of the first-third magnet parts MN1b have a complex technical effect of sensing and controlling the position according to yaw drive by interaction with the third position sensor S3.

In addition, according to the embodiment, the fourth position sensor S4 is provided on the substrate 50 to sense the position of rolling.

The fourth position sensor S4 can be a Hall sensor or an MR sensor (magneto resistive sensor), but is not limited thereto.

For example, the embodiment is capable of roll driving based on the Z axis, and is possible to sense and control the position according to the roll drive by the interaction between the fourth position sensor S4 and the second magnet part MN2 disposed on the substrate 50.

The fourth position sensor S4 can be placed at a position overlapping with the XY1-XY1' axis.

The XY1-XY1' axis can be an axis that passes through the diagonally opposite second magnet part MN2, but is not limited thereto.

According to an embodiment, the second magnet part MN2 can be capable of OIS driving by electromagnetic force between the second coil part CL2.

For example, the second magnet part MN2 can be capable of roll OIS driving by electromagnetic force between the second coil parts CL2.

In addition, the second magnet part MN2 has a complex technical effect of being able to sense and control the position according to roll driving through interaction with the third position sensor S3.

In the embodiment, the second position sensor S2, the third position sensor S3, and the fourth position sensor S4 can be placed both on a first plane formed by the X1-X1' axis and the Y1-Y1' axis, or on a plane horizontal to the first plane.

Accordingly, there is a special technical effect in that position sensing and position correction according to roll driving can be performed precisely even when roll driving is performed while pitch or yaw driving.

Figure 3A:
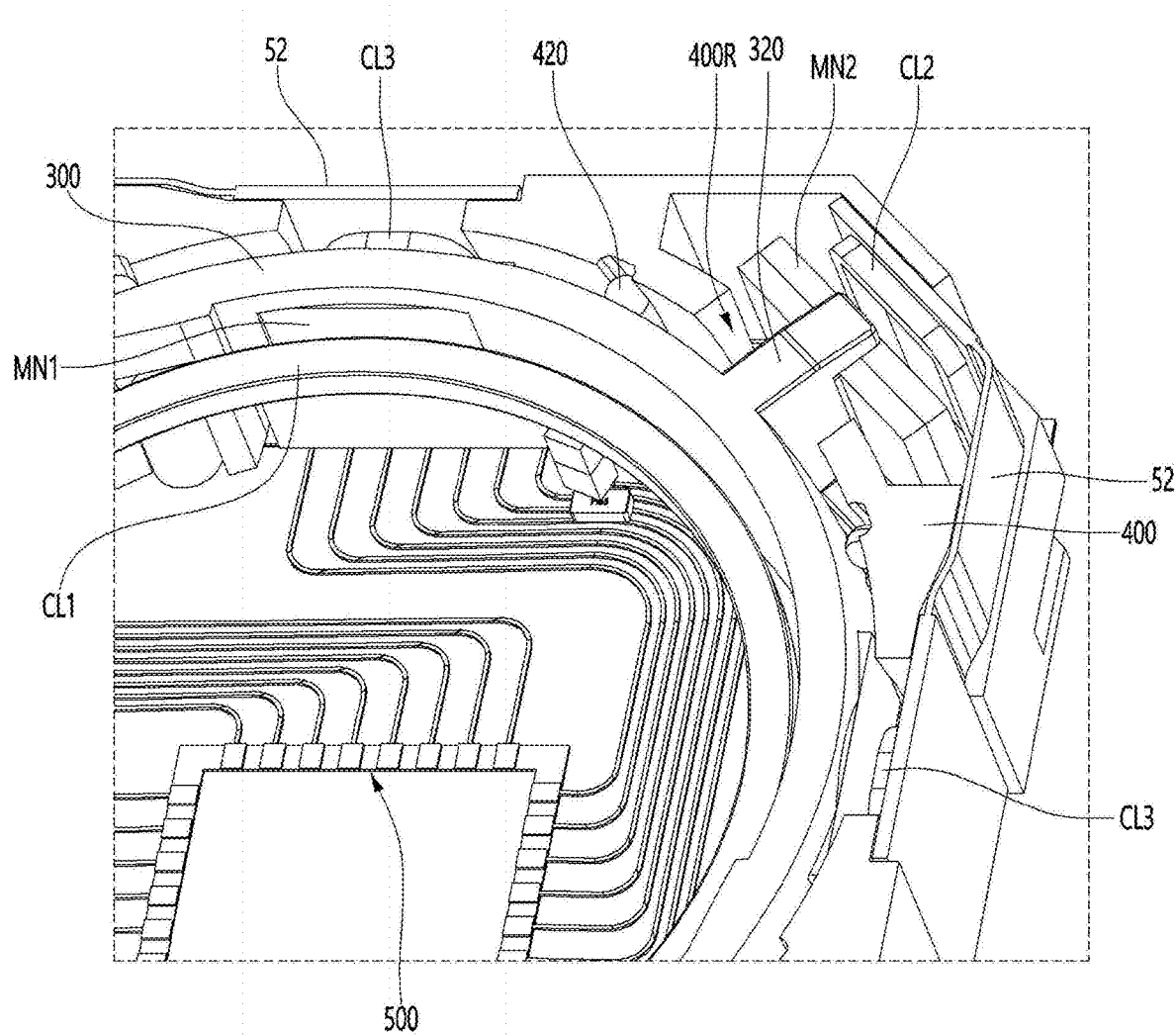
FIG. 3A is an enlarged view of the first area in FIG. 2B.
Figure 3B:
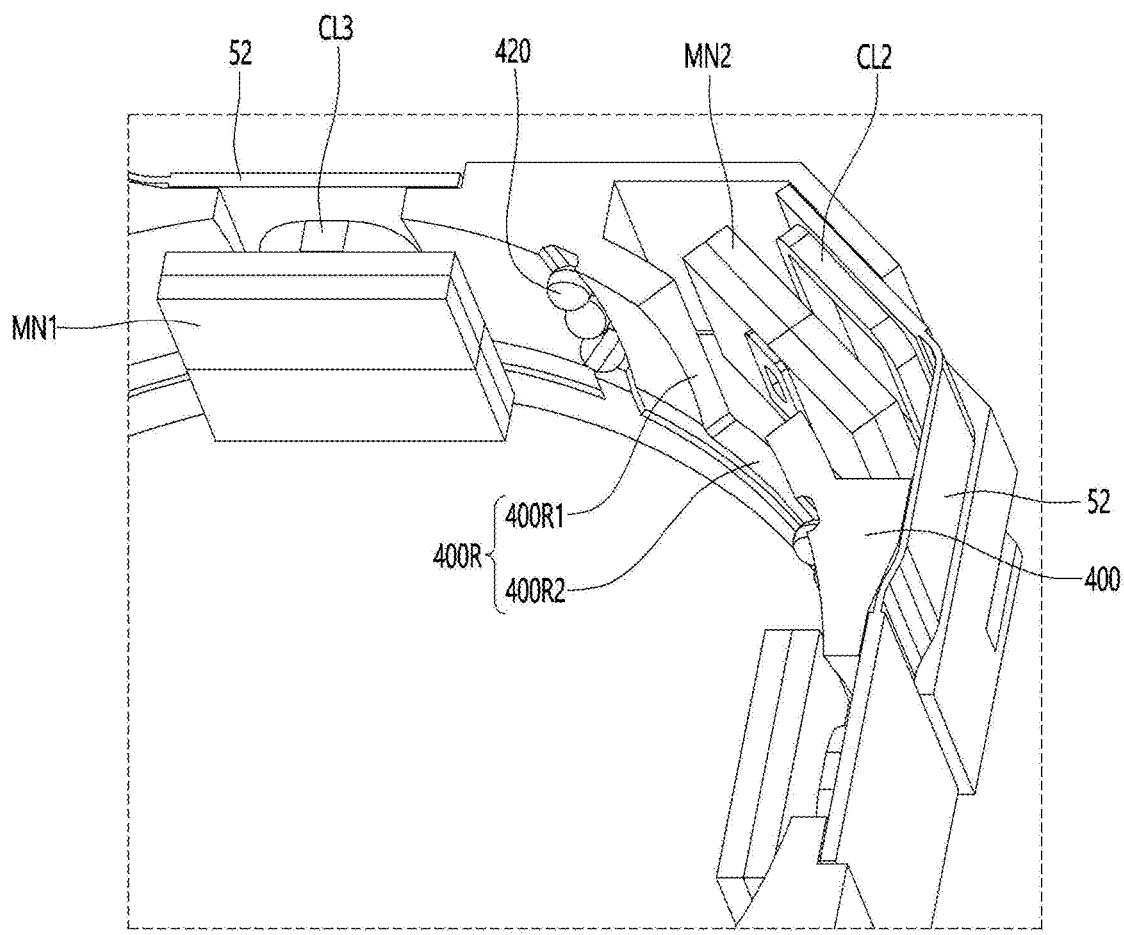
FIG. 3B is an enlarged view of the second area in FIG. 2C.
Figure 3C:
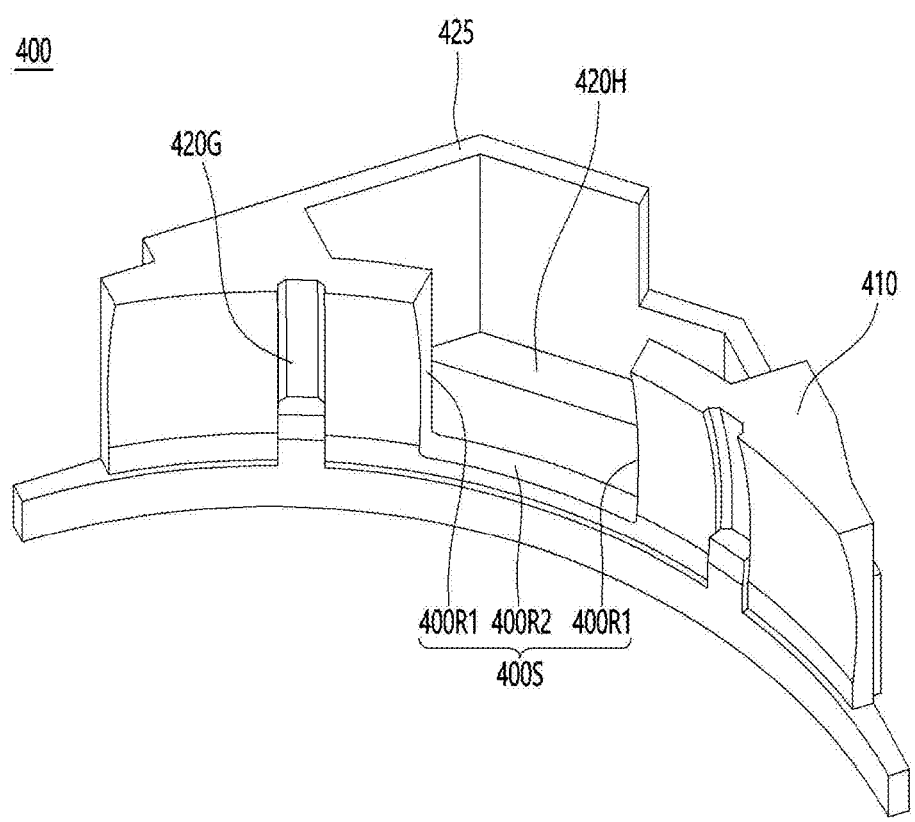
FIG. 3C is an enlarged view of the second housing in FIG. 3B.

Next, FIG. 3A is an enlarged view of the first area P1 in FIG. 2B, and FIG. 3B is an enlarged view of the second area P2 in FIG. 2C. Also, FIG. 3C is an enlarged view of the second housing 400 in FIG. 3B.

Referring to FIG. 3A, in OIS driving in the embodiment, the first housing 300 is moved in pitch, yaw, or roll relative to the second housing 400 by the second guide member 420 disposed between the first housing 300 and the second housing 400.

For example, in an embodiment, OIS driving of pitch or yaw can be possible by electromagnetic force between the first magnet part MN1 and the third coil part CL3.

Also, according to an embodiment, roll OIS driving can be possible by electromagnetic force between the second magnet part MN2 and the second coil part CL2.

Accordingly, in OIS driving in the embodiment, the first housing 300 has a pitch or yaw or roll rotation relative to the second housing 400 by the second guide member 420 disposed between the first housing 300 and the second housing 400.

Also, according to the example, AF driving may be possible along the first guide part 200 by mutual electromagnetic force between another part of the first magnet part MN1 and the first coil part CL1 disposed around the bobbin 200.

Additionally, the embodiment can solve the problem of deteriorating the reliability of the camera module when external shocks, etc. occur in OIS implementation.

For example, in the embodiment, the protrusion 320 of the first housing 300 can be located in the housing groove 400R of the second housing 400, and the protrusion 320 of the first housing 300 and the housing groove 400R of the second housing 400 have the technical effect of implementing a 3-axis OIS-related stopper function.

Therefore, the embodiment can solve the problem of deteriorating the reliability of the camera module when an external shock or the like occurs.

Referring specifically to FIG. 3B, the housing groove 400R can include a groove side wall portion 400R1 and a groove bottom portion 400R2.

The groove side wall portion 400R1 can function as a stopper during roll rotation, and the groove bottom portion 400R2 can function as a stopper during yaw or pitch rotation, but is not limited thereto. Additionally, the groove bottom portion 400R2 can function as a stopper during AF operation.

Also, in the embodiment, the second guide member 420 can be disposed adjacent to the housing groove 400R, which is a stopper structure.

Also, in the embodiment, the second guide member 420 can be arranged to be left and right symmetrical with respect to the housing groove 400R. So, the OIS function can be implemented stably.

Also, in the embodiment, the first guide member 220 can be arranged to overlap the second guide member 420 in the radial direction around the optical axis.

According to the embodiment, there is a complex technical effect in that the protrusion 320 of the first housing 300 has an OIS stopper function in addition to the technical effect of improving the driving force in implementing roll OIS through the mounting part function of the second magnet part MN2.

Also, according to the embodiment, the second housing 400 has the technical effect of serving as a stopper while accommodating the second coil part CL2, etc.

Additionally, according to the embodiment, the second magnet part MN2 can be disposed closer to the second coil portion CL2 than the housing groove 400R.

Next, referring to FIG. 3C, the second housing 400 includes a housing body 410, a guide groove 420G disposed in the housing body 410, and a housing side wall 425 extending outside the housing body 410. A housing hole 420H may be provided between the housing side wall 425 and the housing body 410.

A second guide member 420 can be disposed in the guide groove 420G to enable OIS implementation. Additionally, the coil substrate 52 and the second coil part CL2 can be disposed in the housing hole 420H to enable OIS implementation.

According to the embodiment, the protrusion 320 of the first housing 300 may be located in the housing groove 400R of the second housing 400, and the protrusion 320 of the first housing 300 and the housing groove 400R of the second housing 400 have the technical effect of implementing a 3-axis OIS-related stopper function. Accordingly, the embodiment can solve the problem of deteriorating the reliability of the camera module when an external shock or the like occurs.

Figure 4A:
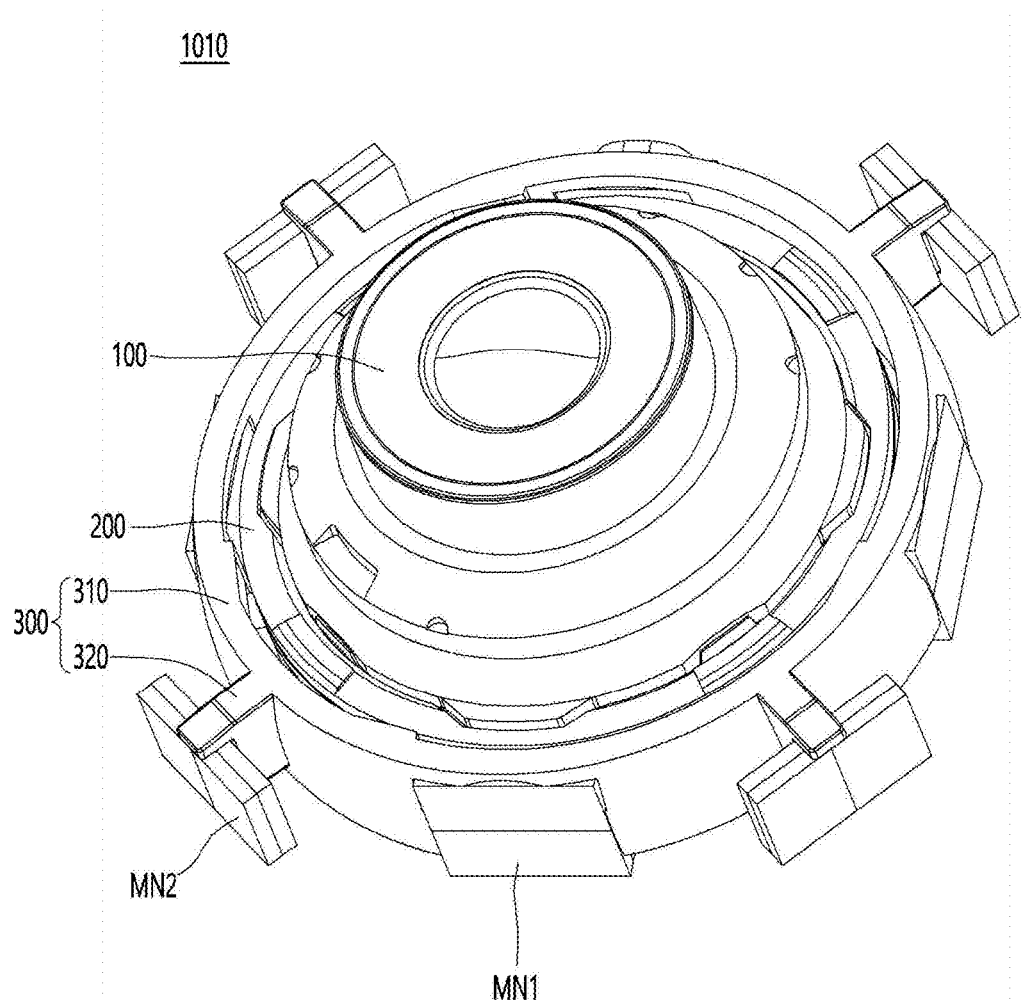
FIG. 4A is a perspective view of a lens driving device in a camera module according to the embodiment shown in FIG. 2A.

Next, FIG. 4A is a perspective view of the lens driving device 1010 in the camera module according to the embodiment shown in FIG. 2A.

Referring to FIG. 4A, the lens driving device 1010 according to the embodiment includes a bobbin 200 on which the lens 100 is placed, a first housing 300 on which the bobbin 200 is placed, and a first guide member 220 disposed between the bobbin 200 and the first housing 300.

In addition, in the lens driving device 1010 according to the embodiment, the first housing 300 includes a housing frame 310 disposed around the outer periphery of the bobbin 200 and a protrusion 320 extending from the housing frame 310. The protrusions 320 can be provided in plural numbers.

For example, four protrusions 320 can each protrude in the direction of the second housing 400, but are not limited thereto.

Additionally, the lens driving device 1010 according to the embodiment includes a first magnet part MN1 disposed on the housing frame 310 and a second magnet part MN2 disposed on the protrusion 320 of the housing frame 310.

In an embodiment, AF driving can be possible by interaction between a portion of the first magnet part MN1 and the first coil portion CL1. Additionally, OIS operation can be possible through interaction between the second magnet part MN2 and the second coil part CL2.

Additionally, OIS operation can be possible through interaction between another part of the first magnet part MN1 and the third coil part CL3.

Figure 4B:
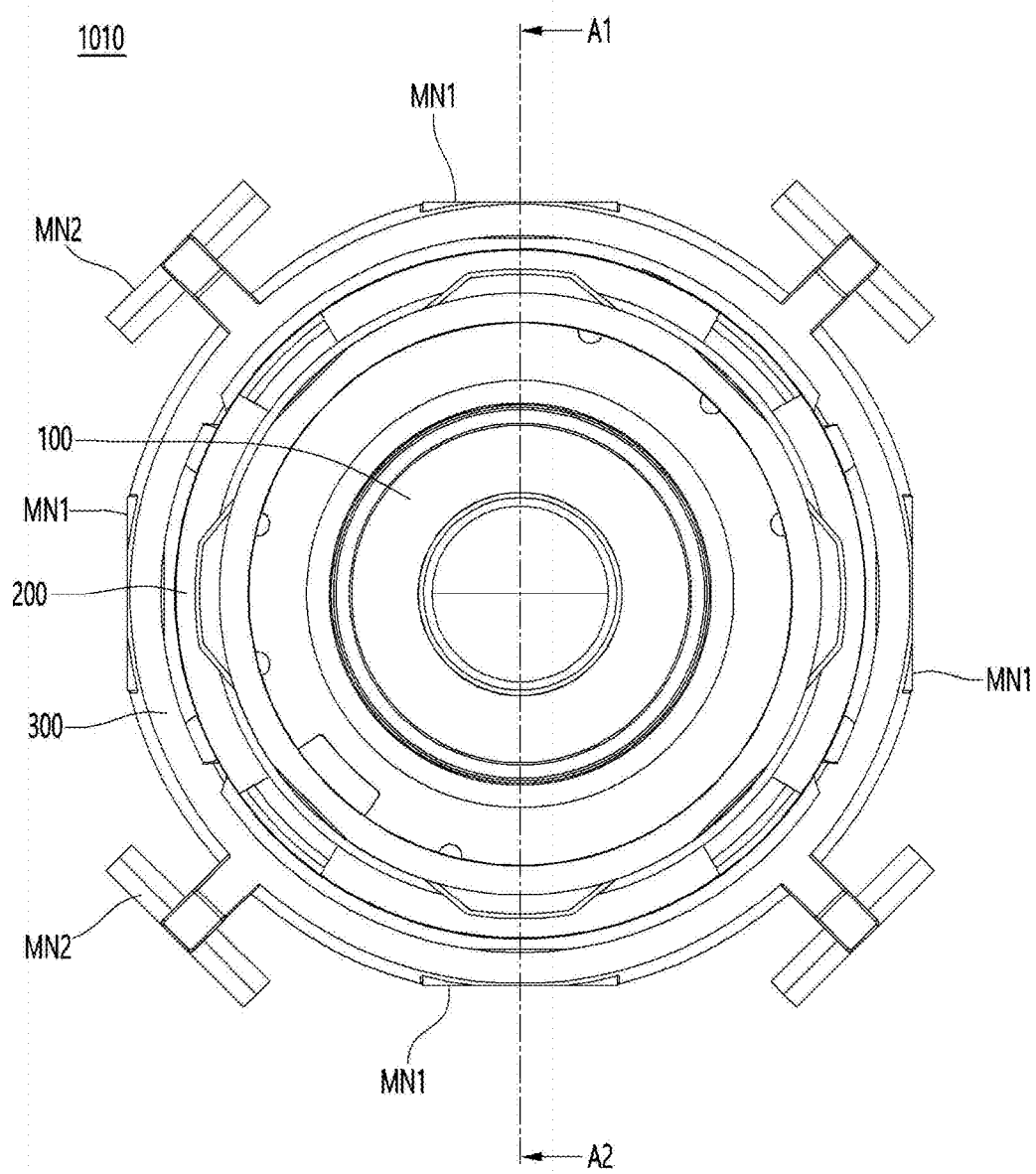
FIG. 4B is a plan view of the lens driving device according to the embodiment shown in FIG. 4A.
Figure 4C:
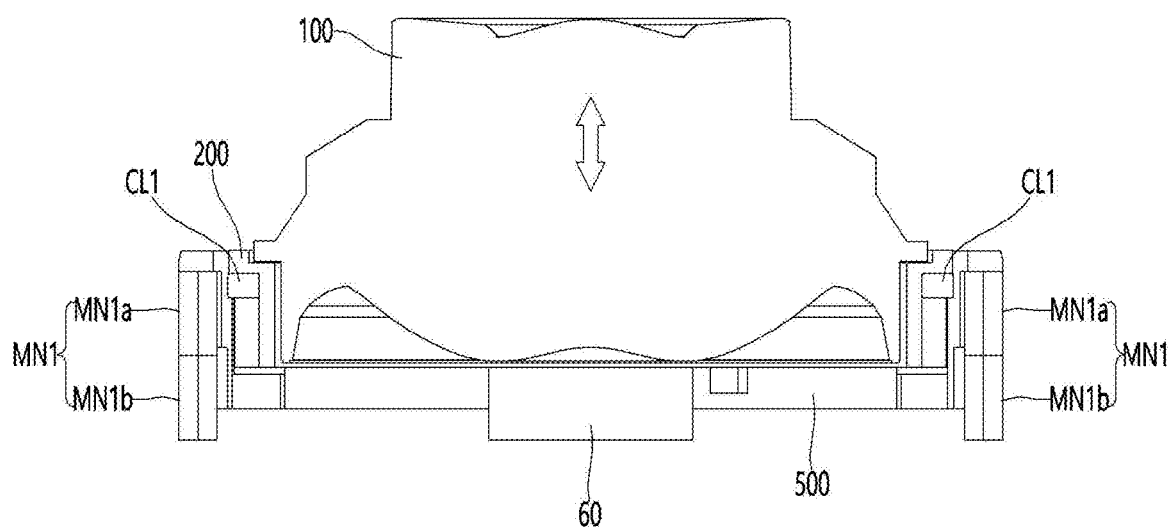
FIG. 4C is a cross-sectional view taken along line A1-A2 of the lens driving device according to the embodiment shown in FIG. 4B.

Next, FIG. 4B is a plan view of the lens driving device 1010 according to the embodiment shown in FIG. 4A, and FIG. 4C is a cross-sectional view along a line A1-A2 of the lens driving device 1010 according to the embodiment shown in FIG. 4B.

As shown in FIG. 4C, AF driving is possible by the interaction between the first magnet part MN1 and the first coil portion CL1 disposed on the bobbin 200, and the lens 100 can be moved up and down in the optical axis direction by the movement of the bobbin 200 and the distance from the image sensor 60 can be controlled.

At this time, the first magnet unit (MN1) may include a bipolar magnetized magnet.

For example, the first magnet part MN1 can include a first-first magnet MN1a and a first-second magnet MN1b. The first-first magnet MN1a can be arranged to face the first coil part CL1.

In the embodiment, AF driving can be possible as long as the vertical width of the first-first magnet MN1a, but is not limited to this. The first-second magnet MN1b can contribute to OIS driving by interacting with the third coil part CL3.

Additionally, the first-first magnet MN1a can contribute to OIS driving by interacting with the third coil part CL3. That is, the first-first magnet MN1a can be a magnet for both AF driving and OIS, but is not limited thereto.

Figure 5A:
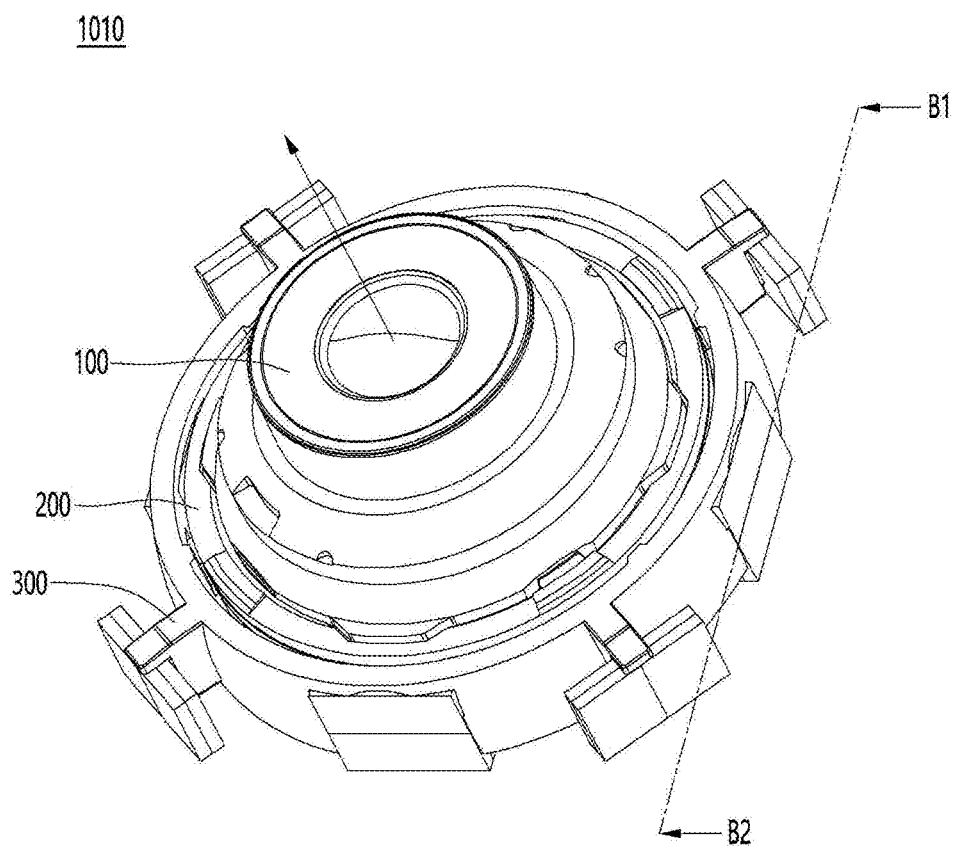
FIG. 5A is a perspective view of a lens driving device according to the embodiment shown in FIG. 2A.
Figure 5B:
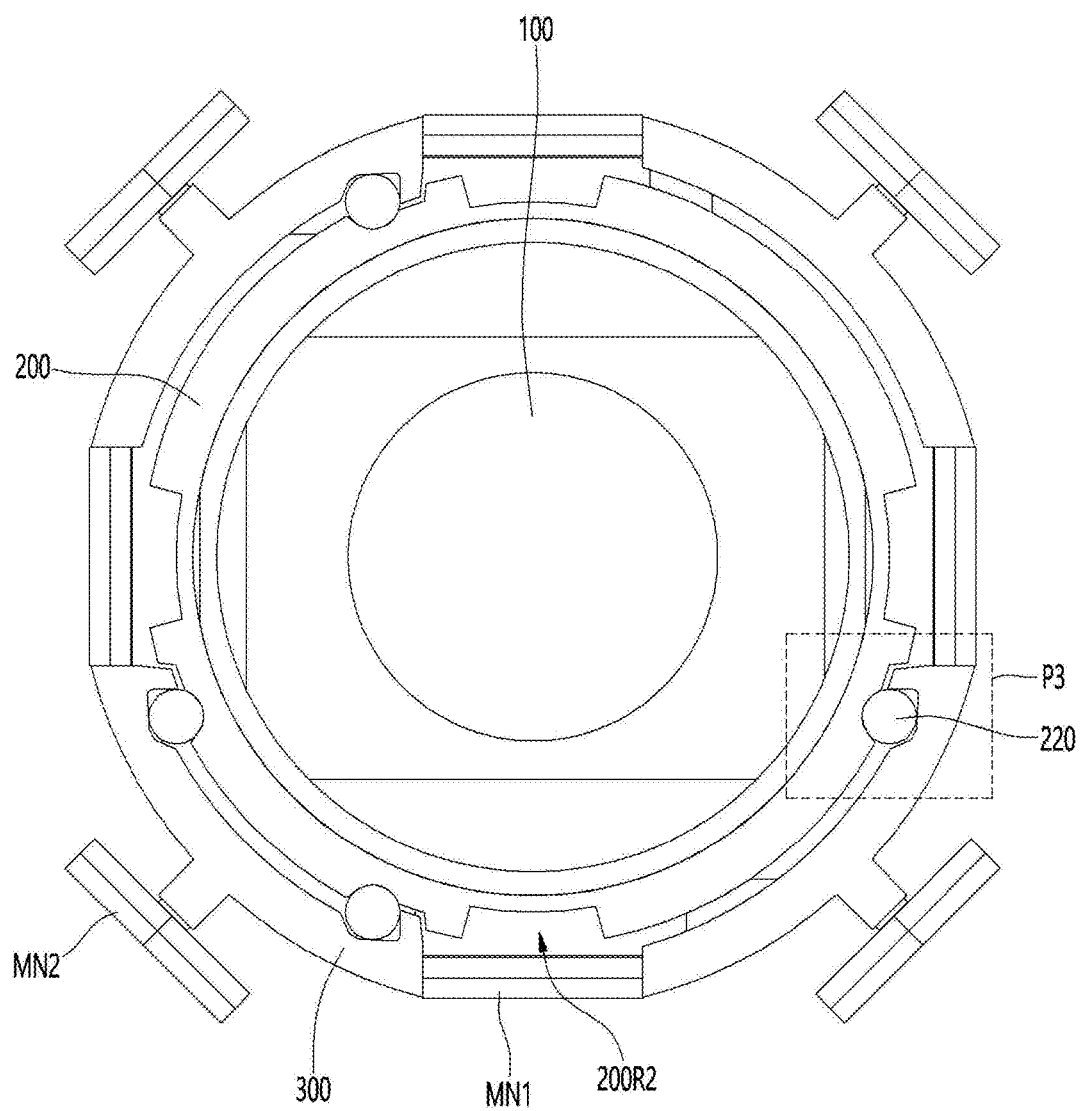
FIG. 5B is a side cross-sectional view of the lens driving device according to the embodiment shown in FIG. 5A taken along line B1-B2 perpendicular to the Z-axis.

Next, FIG. 5A is a perspective view of the lens driving device 1010 according to the embodiment shown in FIG. 2A, and FIG. 5B is a side cross-sectional view of the lens driving device 1010 according to the embodiment shown in FIG. 5A taken along line B1-B2 perpendicular to the Z-axis.

Referring to FIG. 5B, the lens driving device 1010 according to the embodiment includes a bobbin 200 on which the lens 100 is placed, a first housing 300 on which the bobbin 200 is placed, and a first guide member 220 disposed between the bobbin 200 and the first housing 300.

The first guide member 220 can be arranged in plural numbers. For example, it can include four first guide members 220 disposed between the bobbin 200 and the first housing 300, but is not limited thereto.

The first guide member 220 can have a shaft shape, but is not limited thereto.

Also, referring to FIG. 5B, the bobbin 200 of the embodiment can include a second recess 200R2 in an area corresponding to the first magnet MN1 disposed in the first housing 300.

According to the embodiment, the electromagnetic force between the first magnet MN1 and the first coil part CL1 can be improved as the second recess 200R2 is disposed in the bobbin 200, and driving power can be improved by reducing the weight of the bobbin 200.

Figure 6A:
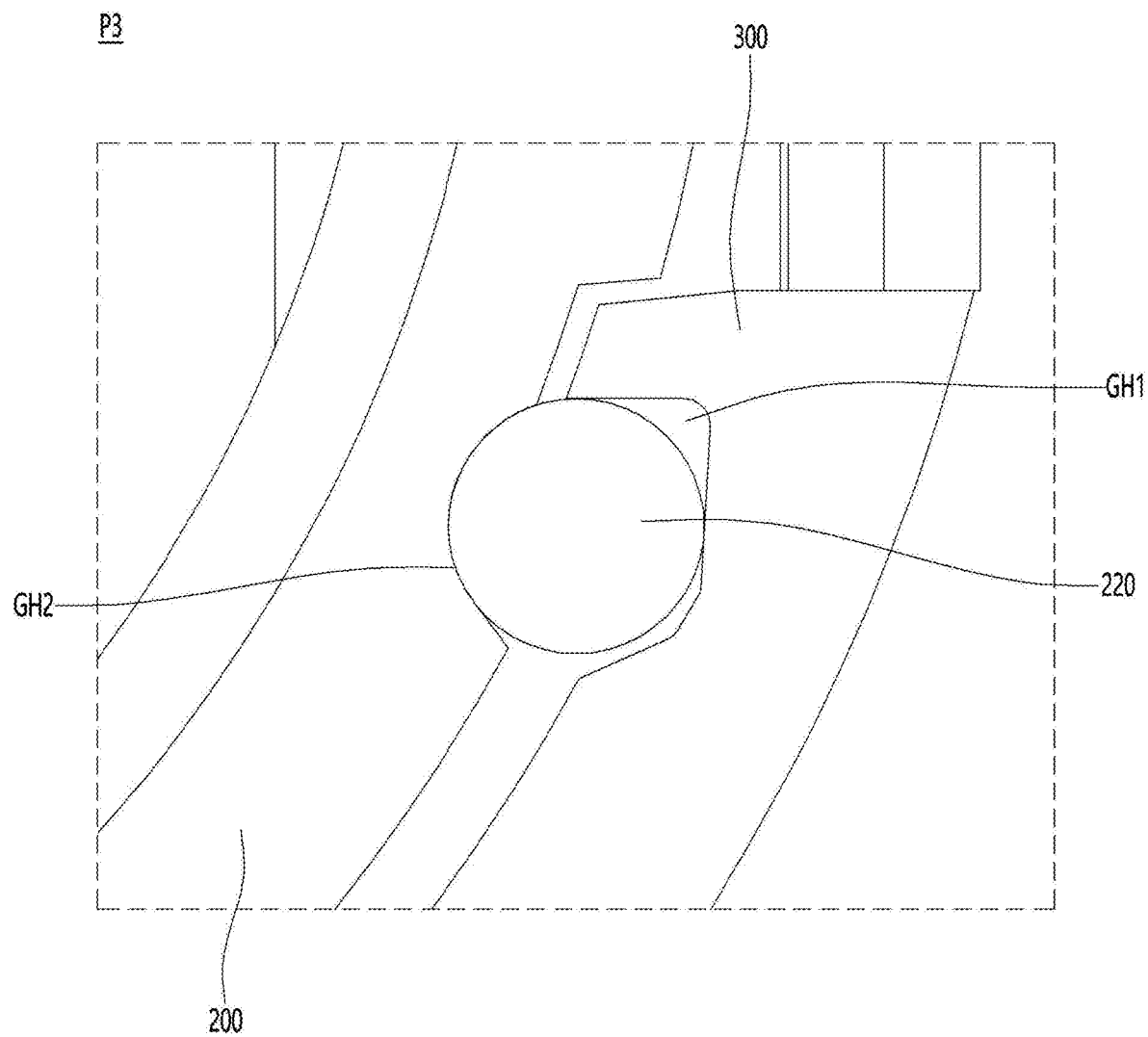
FIG. 6A is an enlarged view of a third region in a side cross-sectional view of the lens driving device according to the embodiment shown in FIG. 5B.
Figure 6B:
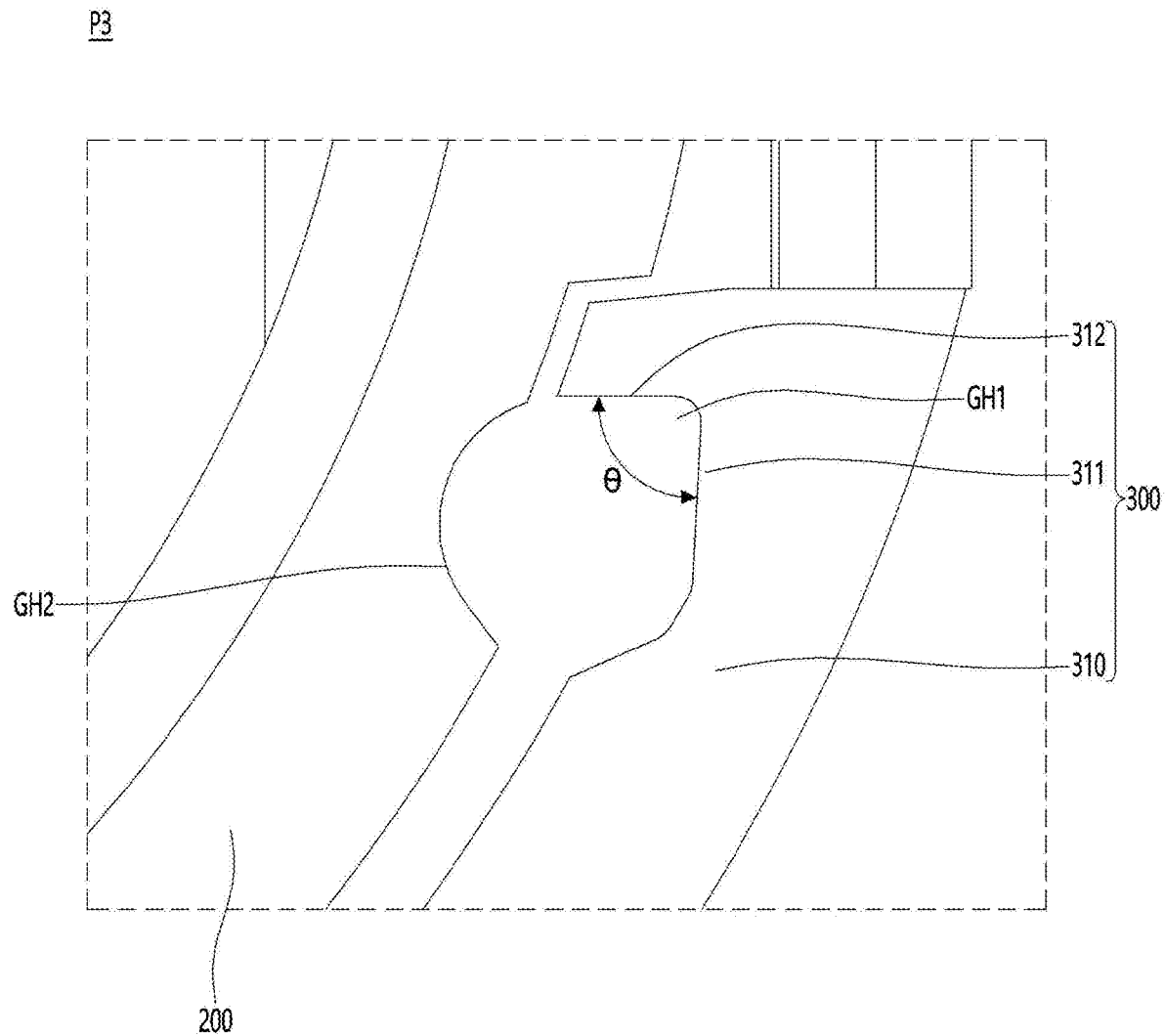
FIG. 6B is a first detailed view of FIG. 6A.
Figure 6C:
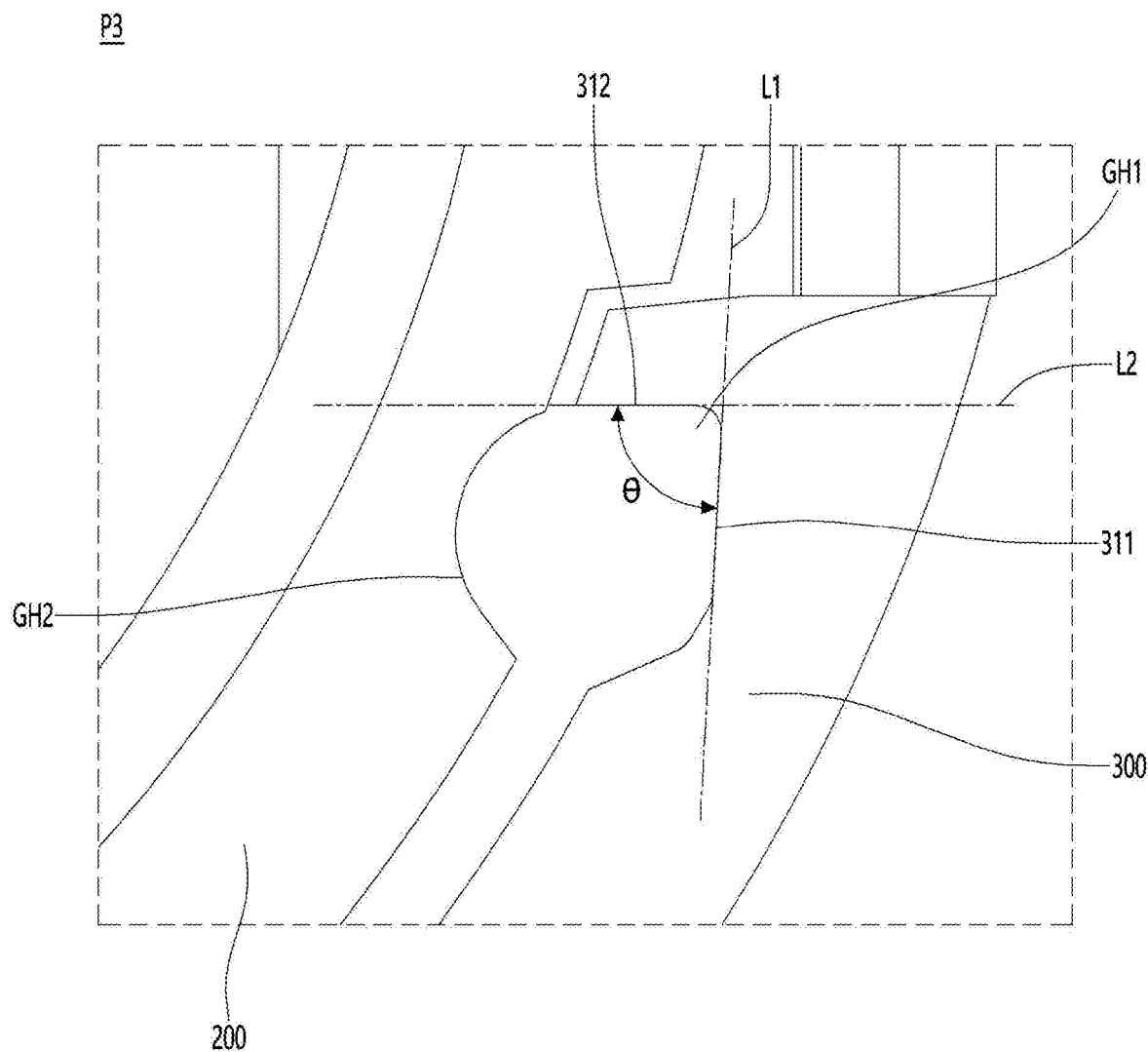
FIG. 6C is a second detailed view of FIG. 6A.
Figure 6D:
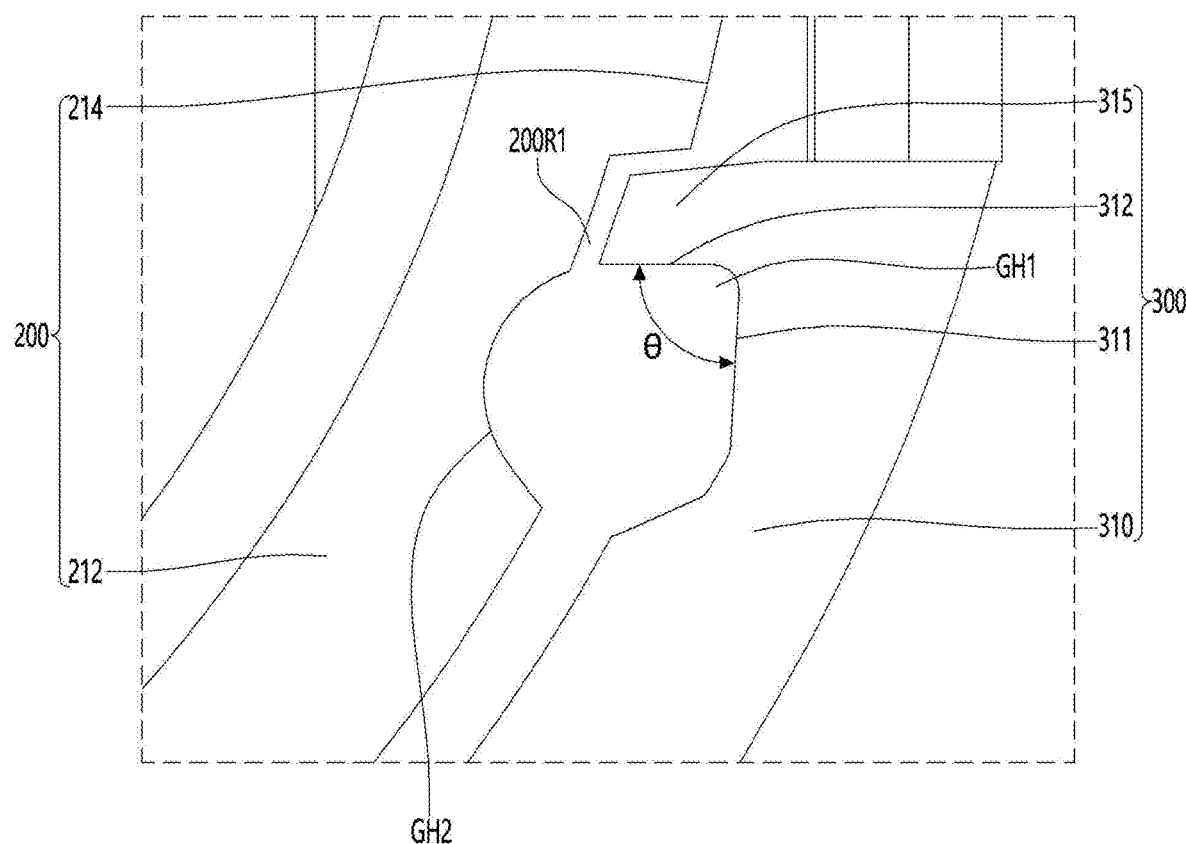
FIG. 6D is a third detailed view of FIG. 6A.

Next, FIG. 6A is an enlarged view of the third area P3 in a side cross-sectional view of the lens driving device 1010 according to the embodiment shown in FIG. 5B, and FIG. 6B is a first detailed view of FIG. 6A, FIG. 6C is a second detailed view of FIG. 6A, and FIG. 6D is a third detailed view of FIG. 6A.

For example, FIG. 6B is the first detailed drawing for the enlarged view of the third area P3 of the side cross-sectional view of the lens driving device 1010 according to the embodiment shown in FIG. 6A while the first guide member 220 is omitted, and FIG. 6C is a second detailed view in which the first guide member 220 is omitted from the enlarged view of the third area P3 of the side cross-sectional view of the lens driving device 1010 according to the embodiment shown in FIG. 6A.

First, referring to FIG. 6A, in the embodiment, the first housing 300 can be provided with a first guide groove GH1 in which the first guide member 220 is disposed. The first guide groove GH1 can have an asymmetric shape.

Additionally, the bobbin 200 can be provided with a second guide groove GH2 where the first guide member 220 is disposed. The second guide groove GH2 can have a shape corresponding to the outer peripheral surface of the first guide member 220. For example, the second guide groove GH2 can have a curved shape corresponding to the outer peripheral surface of the first guide member 220.

Referring specifically to FIG. 6B, the first housing 300 includes a hollow housing frame 310 that accommodates the bobbin 200, and the first guide groove GH1 is located inside of the first housing frame 310.

The first guide groove GH1 has a first guide surface 311 and a second guide surface 312 that can contact the first guide member 220, and the angle Θ formed by the first guide surface 311 and the second guide surface 312 can be an acute angle.

Additionally, the first guide groove GH1 can include a first guide surface 311 and a second guide surface 312 that can be in contact with the first guide member 220. The first guide surface 311 and the second guide surface 312 can be flat.

According to the lens driving device and the camera module including the same according to the embodiment, the technical problem of the lens driving device being separated when an impact is applied to the camera module can be solved.

For example, in the embodiment, the first guide member 220 for AF driving of the lens is disposed between the first guide groove GH1 and the second guide groove GH2, and the groove GH1 and the second guide groove GH2 can function as a guide rail.

According to the embodiment, the first guide groove GH1 where the first guide member 220 is disposed has an asymmetric shape to inhibit the first guide member 220 from being separated even when an impact or the like occurs, so there is the technical effect of providing a path for the lens to move with minimal friction.

Also, in the embodiment, the angle Θ formed by the first guide surface 311 and the second guide surface 312 can be an acute angle, so even if an impact or the like occurs, there is a technical effect of inhibiting the deviation of the first guide member 220.

Specifically, referring to FIG. 6C, the angle Θ formed by the first guide surface 311 and the second guide surface 312 can be an acute angle with respect to a first line L1 extending from the first guide surface 311 in the first guide groove GH1 and a second line L2 extending from the second guide surface 312.

The first line L1 and the second line L2 can be one of the tangent lines to the first guide member 220.

According to the embodiment, the technical problem of the first guide member 220 being separated when an impact is applied can be solved by controlling the angle formed between the first guide surface 311 and the second guide surface 312 in the first guide groove GH1 of the first housing 300 to be an acute angle.

Next, referring to FIG. 6D, the bobbin 200 includes a bobbin frame 212 in which a second guide groove GH2 is formed, and a first recess 200R1 provided inward from the outermost edge 214 of the bobbin frame.

The first housing 300 can include a first guide protrusion 315 protruding from the first housing frame 310 in the direction of the bobbin 200, and the first guide protrusion 315 can be placed on the first recess 200R1 of the bobbin 200.

The first guide protrusion 315 can be disposed lower than the outermost edge 214 of the bobbin 200. So, it is possible to effectively inhibit separation of the first guide member 220.

For example, the first guide protrusion 315 of the first housing 300 protrudes in the direction of the bobbin 200 and is disposed to protrude up to the first recess 200R1 of the bobbin 200, so that the first guide protrusion 220 does not come off even in situations such as impact and is firmly located in the first guide groove GH1 and in the second guide groove GH2, such that reliability can be improved by inhibiting AF module separation due to impact.

Additionally, according to the embodiment, it is possible to solve the technical problems of high-frequency vibration generation due to the preload spring structure in the AF structure, increased driving resistance, or dynamic tilt.

For example, according to the embodiment, a spring vulnerable to high-frequency vibration is removed from the AF structure and a guide shaft is applied to provide a structure that moves the lens with minimal friction and tilt.

For example, in the embodiment, by adopting the first guide member 220 in the form of a guide shaft, it can move up and down in point contact with the first housing 300. In addition, according to the embodiment, the first guide member 220 for AF driving is disposed between the first guide groove GH1 and the second guide groove GH2, thereby eliminating the spring structure compared to the related art and causing vibration due to high frequency. Also, there is no spring structure, there is less driving resistance, lowering power consumption, and the embodiment has the technical effect of less dynamic tilt compared to the guide bearing structure.

Also, according to the embodiment, there is a technical effect of inhibiting magnetic field interference between magnets when implementing AF or OIS. For example, in the internal technology, there is a problem in that AF driving or OIS driving is not performed properly due to magnetic field interference between the magnet for AF driving and the magnet for OIS driving, resulting in a decrease in thrust. Additionally, there is a problem of causing decenter or tilt phenomenon due to magnetic field interference between magnets.

According to an embodiment, a lens driving device and a camera module including the same can inhibit magnetic field interference between magnets by varying the arrangement positions of the second magnet part MN2 for OIS driving and the first magnet part MN1 for AF driving.

Figure 7:
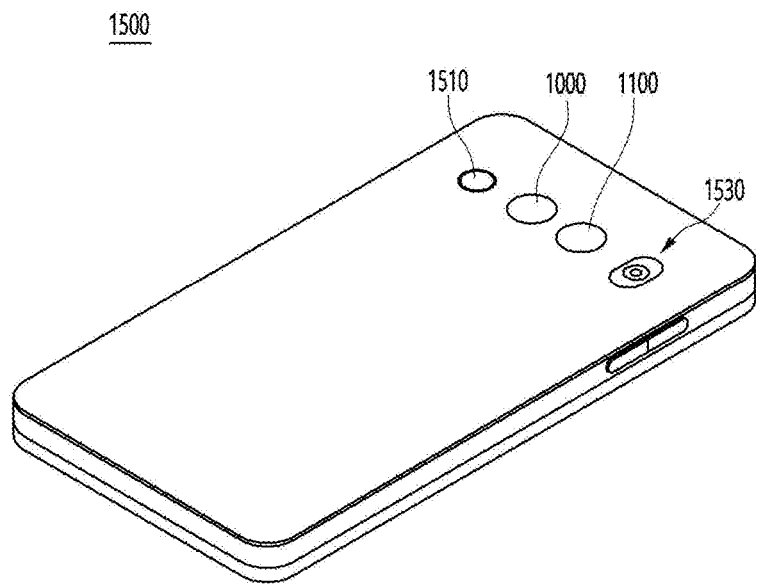
FIG. 7 is a perspective view of a mobile terminal to which a camera module is applied according to an embodiment.

Next, FIG. 7 shows a mobile terminal 1500 to which a camera module according to an embodiment is applied.

As shown in FIG. 7, the mobile terminal 1500 of the embodiment can include a camera module 1000, a flash module 1530, and an autofocus device 1510 provided on the rear. The mobile terminal 1500 of the embodiment can further include a second camera module 1100.

The camera module 1000 can include an image capture function and an autofocus function. For example, the camera module 1000 can include an autofocus function using an image.

The camera module 1000 processes image frames of still or moving images obtained by an image sensor in shooting mode or video call mode. The processed image frame can be displayed on a certain display unit and stored in memory. A camera (not shown) can also be placed on the front of the mobile terminal body.

For example, the camera module 1000 can include a first camera module and a second camera module, and the first camera module can enable OIS implementation along with AF or zoom functions.

The flash module 1530 can include a light-emitting element therein that emits light. The flash module 1530 can be operated by operating a camera of a mobile terminal or by user control.

The autofocus device 1510 can include one of the packages of surface light-emitting laser devices as a light emitting unit.

The autofocus device 1510 can include an autofocus function using a laser. The autofocus device 1510 can be mainly used in conditions where the autofocus function using the image of the camera module 1000 is deteriorated, for example, in close proximity of 10 m or less or in dark environments. The autofocus device 1510 can include a light emitting unit including a vertical cavity surface emitting laser (VCSEL) semiconductor device, and a light receiving unit such as a photo diode that converts light energy into electrical energy.

INDUSTRIAL APPLICABILITY

Figure 8:
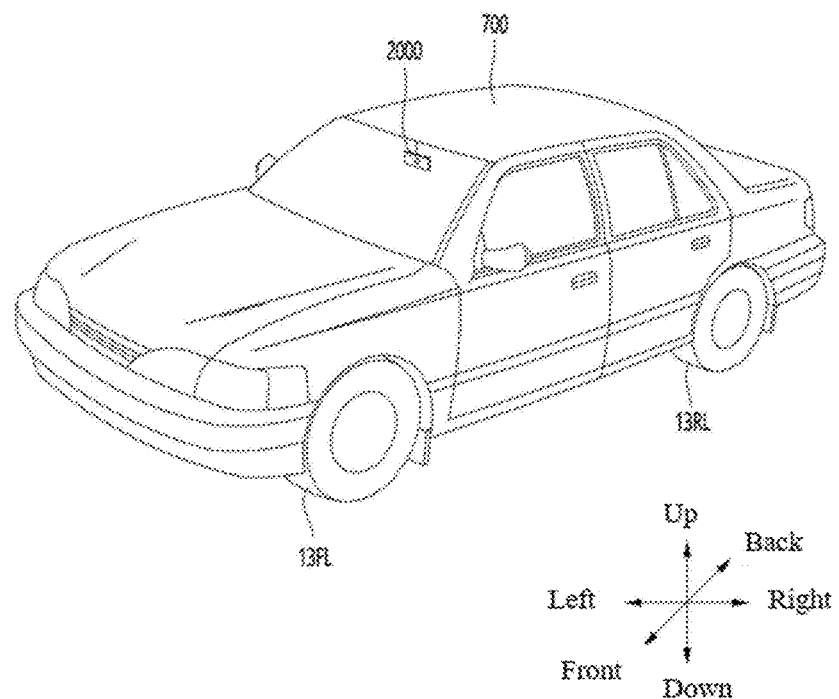
FIG. 8 is a perspective view of a vehicle to which a camera module according to an embodiment is applied.

FIG. 8 is a perspective view of a vehicle 700 to which a camera module according to an embodiment is applied.

For example, FIG. 8 is an external view of a vehicle equipped with a vehicle driving assistance device to which the camera module 1000 according to an embodiment is applied.

Referring to FIG. 8, the vehicle 700 of the embodiment can be provided with wheels 13FL and 13FR that rotate by a power source and a predetermined sensor. The sensor can be a camera sensor 2000, but is not limited thereto.

The camera 2000 can be a camera sensor to which the camera module 1000 according to the embodiment is applied.

The vehicle 700 of the embodiment can acquire image information through a camera sensor 2000 that captures a front image or surrounding image, uses the image information to determine the lane identification situation, and uses the image information to determine the lane identification situation and lanes can be created.

For example, the camera sensor 2000 acquires a front image by photographing the front of the vehicle 700, and a processor (not shown) can acquire image information by analyzing objects included in the front image.

For example, if the image captured by the camera sensor 2000 captures objects such as lanes, adjacent vehicles, obstacles to driving, and median strips, curbs, and street trees corresponding to indirect road markings, the processor objects can be detected and included in image information.

At this time, the processor can further supplement the image information by obtaining distance information to the object detected through the camera sensor 2000. Image information can be information about an object captured in an image.

This camera sensor 2000 can include an image sensor and an image processing module. The camera sensor 2000 can process still images or moving images obtained by an image sensor (eg, CMOS or CCD). The image processing module can process still images or moving images obtained through an image sensor, extract necessary information, and transmit the extracted information to the processor.

At this time, the camera sensor 2000 can include a stereo camera to improve measurement accuracy of the object and secure more information such as the distance between the vehicle 700 and the object, but is not limited thereto.

The vehicle 700 of the embodiment can provide an advanced driver assistance system (ADAS).

For example, advanced driver assistance systems (ADAS) include Autonomous Emergency Braking (AEB), which slows down or stops on its own without the driver having to apply the brakes in the event of a collision, and changes the direction of driving when leaving the lane. Lane Keep Assist System (LKAS), which adjusts and maintains the lane, Advanced Smart Cruise Control (ASCC), which automatically maintains the distance from the vehicle in front while driving at a preset speed, and blind spot control. These include Active Blind Spot Detection (ABSD), which detects the risk of collision and helps change lanes safely, and Around View Monitor (AVM), which visually shows the situation around the vehicle.

In these advanced driver assistance systems (ADAS), camera modules function as core components along with radar, and the proportion of camera modules being applied is gradually expanding.

For example, in the case of the automatic emergency braking system (AEB), the vehicle's front camera sensor and radar sensor can detect vehicles or pedestrians in front and automatically apply emergency braking when the driver does not control the vehicle. Alternatively, in the case of the driving steering assistance system (LKAS), a camera sensor can be used to detect whether the driver leaves the lane without using turn signals and automatically steer the steering wheel to maintain the lane. Additionally, the Around View Monitoring System (AVM) can visually show the situation around the vehicle through camera sensors placed on all sides of the vehicle.

The features, structures, effects, etc. described in the embodiments above are included in at least one embodiment and are not necessarily limited to only one embodiment. Furthermore, the features, structures, effects, etc. illustrated in each embodiment can be combined or modified and implemented in other embodiments by a person with ordinary knowledge in the field to which the embodiments belong. Therefore, contents related to such combinations and modifications should be interpreted as being included in the scope of the embodiments.

Although the above description focuses on the examples, this is only an example and does not limit the examples, and those skilled in the art will understand the above examples without departing from the essential characteristics of the examples. It will be able to see that various modifications and applications are possible. For example, each component specifically shown in the examples can be modified and implemented. And these variations and differences related to application should be interpreted as being included in the scope of the embodiments set forth in the appended claims.

The invention claimed is:

1. A lens driving device, comprising:
a board;
a first frame including a lens and disposed on the substrate;
a second frame on which the first frame is disposed; and
a third frame on which the second frame is disposed,
wherein the first frame is configured to move in a Z-axis direction,
wherein the second frame is configured to tilt in X-axis and Y-axis directions and to rotate around the Z axis, and
wherein the third frame comprises a stopper structure configured to limit tilting and rotation of the second frame.

2. The lens driving device according to claim 1, comprising a second position sensor and a third position sensor disposed on the substrate and configured to sense degree of tilting of the second frame in the X-axis and Y-axis directions.

3. The lens driving device according to claim 2, comprising a fourth position sensor disposed on the substrate and configured to sense degree of rotation of the second frame around the Z-axis.

4. The lens driving device according to claim 2, wherein the second position sensor is configured to sense a pitch position by interaction with a first-second magnet part disposed in the second frame.

5. The lens driving device according to claim 2, wherein the third position sensor is configured to sense a yaw position by interaction with a first-third magnet part disposed in the second frame.

6. The lens driving device according to claim 3, wherein the fourth position sensor is configured to sense a rolling position by interaction with a second magnet part disposed on the third frame.

7. The lens driving device according to claim 1, wherein the third frame comprises the stopper structure configured to limit tilting and rotation of the second frame, and the stopper structure is disposed at at least one corner of the third frame.

8. The lens driving device according to claim 7, wherein the stopper structure comprises four stopper structures including two stopper structures in the X-axis direction and two stopper structures in the Y-axis direction.

9. The lens driving device according to claim 7, wherein the stopper structure is symmetrically disposed at four corners of the third frame.

10. A camera module comprising the lens driving device of claim 1.

11. The lens driving device according to claim 6, wherein the fourth position sensor comprises a Hall sensor or an MR sensor (magneto resistive sensor).

12. The lens driving device according to claim 6, wherein the fourth position sensor is disposed at four corners of the third frame.

13. The lens driving device according to claim 1, wherein the third frame comprises a housing groove as the stopper structure.

14. The lens driving device according to claim 13, wherein a second guide member is disposed adjacent to the housing groove.

15. The lens driving device according to claim 13, wherein a protrusion of the second frame is located in the housing groove of the third frame.

16. The lens driving device according to claim 13, wherein the housing groove comprises a groove side wall portion and a groove bottom portion extended from the groove side wall portion.

17. The lens driving device according to claim 16, wherein the groove side wall portion is configured to function as a stopper during roll rotation.

18. The lens driving device according to claim 16, wherein the groove bottom portion is configured to function as a stopper during yaw or pitch rotation.

19. The lens driving device according to claim 16, wherein the groove bottom portion is configured to function as a stopper during AF operation.

20. The lens driving device according to claim 14, wherein the second guide member is arranged to be left and right symmetrical with respect to the housing groove.

* * * * *